(12) United States Patent
Yamasaki et al.

(10) Patent No.: US 8,709,693 B2
(45) Date of Patent: *Apr. 29, 2014

(54) POLYESTER RESIN FOR TONER, ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(75) Inventors: Sumiaki Yamasaki, Kanagawa (JP); Yuki Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,117

(22) Filed: Sep. 11, 2012

(65) Prior Publication Data

US 2013/0244171 A1 Sep. 19, 2013

(30) Foreign Application Priority Data

Mar. 19, 2012 (JP) ................. 2012-062805

(51) Int. Cl.
*G03G 9/087* (2006.01)

(52) U.S. Cl.
USPC ............ 430/109.4; 430/123.5; 528/176; 399/252

(58) Field of Classification Search
USPC ............ 430/109.4, 123.5; 528/176; 399/252
See application file for complete search history.

(56) References Cited

U.S. PATENT DOCUMENTS

| | | |
|---|---|---|
| 2003/0203301 A1 | 10/2003 | Iga |
| 2004/0152813 A1 | 8/2004 | Shirai |

(Continued)

FOREIGN PATENT DOCUMENTS

| | | |
|---|---|---|
| EP | 2 511 319 A1 | 10/2012 |
| JP | A-59-22919 | 2/1984 |

(Continued)

OTHER PUBLICATIONS

Translation of JP 2011-246647 published Dec. 2011.*

(Continued)

*Primary Examiner* — Peter Vajda
(74) *Attorney, Agent, or Firm* — Oliff PLC

(57) ABSTRACT

A polyester resin for a toner is a polycondensate of a dicarboxylic acid component and an alcohol component including rosin diol that is represented by the following formula (1), and has a weight average molecular weight (Mw) of from 40000 to 150000, and a molecular weight distribution (Mw/Mn) of from 12 to 25:

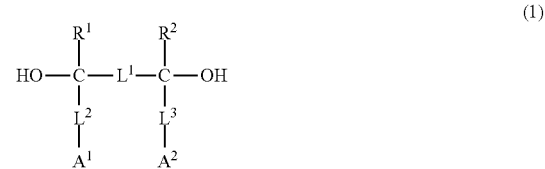

wherein, $R^1$ and $R^2$ each independently represents hydrogen or a methyl group; $L^1$, $L^2$, and $L^3$ each independently represents a divalent linking group selected from a group consisting of a carbonyl group, a carboxyl group, an ether group, a sulfonyl group, a chain-like alkylene group which may have a substituent, a cyclic alkylene group which may have a substituent, an arylene group which may have a substituent, and combinations thereof, and $L^1$ and $L^2$ or $L^1$ and $L^3$ may form a ring; and $A^1$ and $A^2$ represent a rosin ester group.

12 Claims, 2 Drawing Sheets

(56) References Cited

U.S. PATENT DOCUMENTS

| | | | |
|---|---|---|---|
| 2007/0015077 A1 | 1/2007 | Yamashita et al. | |
| 2012/0264041 A1 | 10/2012 | Yamasaki et al. | |
| 2013/0022906 A1* | 1/2013 | Chonan et al. | 430/109.4 |
| 2013/0188986 A1* | 7/2013 | Yamasaki et al. | 399/111 |

FOREIGN PATENT DOCUMENTS

| | | | | |
|---|---|---|---|---|
| JP | A-2004-226569 | | 8/2004 | |
| JP | A-2006-292820 | | 10/2006 | |
| JP | A-2007-137910 | | 6/2007 | |
| JP | A-2007-240831 | | 9/2007 | |
| JP | A-2007-292818 | | 11/2007 | |
| JP | A-2007-322926 | | 12/2007 | |
| JP | B2-4505738 | | 7/2010 | |
| JP | B1-4699558 | | 6/2011 | |
| JP | 2011-246647 | * | 12/2011 | C08G 59/14 |
| JP | A-2012-172027 | | 9/2012 | |
| JP | A-2012-229413 | | 11/2012 | |
| JP | A-2012-229419 | | 11/2012 | |
| JP | A-2012-229420 | | 11/2012 | |
| JP | A-2012-230374 | | 11/2012 | |
| JP | A-2012-230375 | | 11/2012 | |
| JP | A-2012-230376 | | 11/2012 | |
| JP | A-2012-230377 | | 11/2012 | |

OTHER PUBLICATIONS

Jan. 15, 2013 Translation of Japanese Office Action issued in Application No. 2012-092445.
Jul. 2, 2012 Extended European Search Report issued in European Application No. 11 19 0248.2.
U.S. Appl. No. 13/296,494 in the name of Yamasaki et al, filed Nov. 15, 2011.
Jan. 15, 2013 Japanese Office Action issued in Application No. 2012-090444 (with translation).
U.S. Appl. No. 13/626,581 in the name of Chonan et al., filed Sep. 25, 2012.
U.S. Appl. No. 13/626,548 in the name of Yamasaki et al., filed Sep. 25, 2012.
Jun. 21, 2013 Office Action issued in U.S. Appl. No. 13/626,581.
Dec. 18, 2013 Office Action issued in U.S. Appl. No. 13/626,581.
Jun. 24, 2013 Office Action issued in U.S. Appl. No. 13/626,548.

\* cited by examiner

POLYESTER RESIN FOR TONER, ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2012-062805 filed Mar. 19, 2012.

BACKGROUND

Technical Field

The invention relates to a polyester resin for a toner, an electrostatic charge image developing toner, an electrostatic charge image developer, a toner cartridge, a process cartridge, an image forming apparatus, and an image forming method.

SUMMARY

According to an aspect of the invention, there is provided a polyester resin for a toner which is a polycondensate of a dicarboxylic acid component and an alcohol component including rosin diol that is represented by the following formula (1), and has a weight average molecular weight (Mw) of from 40000 to 150000, and a molecular weight distribution (Mw/Mn) of from 12 to 25:

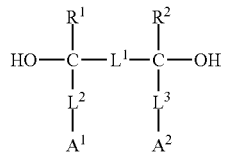

(1)

wherein, $R^1$ and $R^2$ each independently represents hydrogen or a methyl group; $L^1$, $L^2$, and $L^3$ each independently represents a divalent linking group selected from a group consisting of a carbonyl group, a carboxyl group, an ether group, a sulfonyl group, a chain-like alkylene group which may have a substituent, a cyclic alkylene group which may have a substituent, an arylene group which may have a substituent, and combinations thereof, and $L^1$ and $L^2$ or $L^1$ and $L^3$ may form a ring, and $A^1$ and $A^2$ represent a rosin ester group.

BRIEF DESCRIPTION OF THE DRAWINGS

Exemplary embodiments of the present invention will be described in detail based on the following figures, wherein.

DETAILED DESCRIPTION

Figure 1:
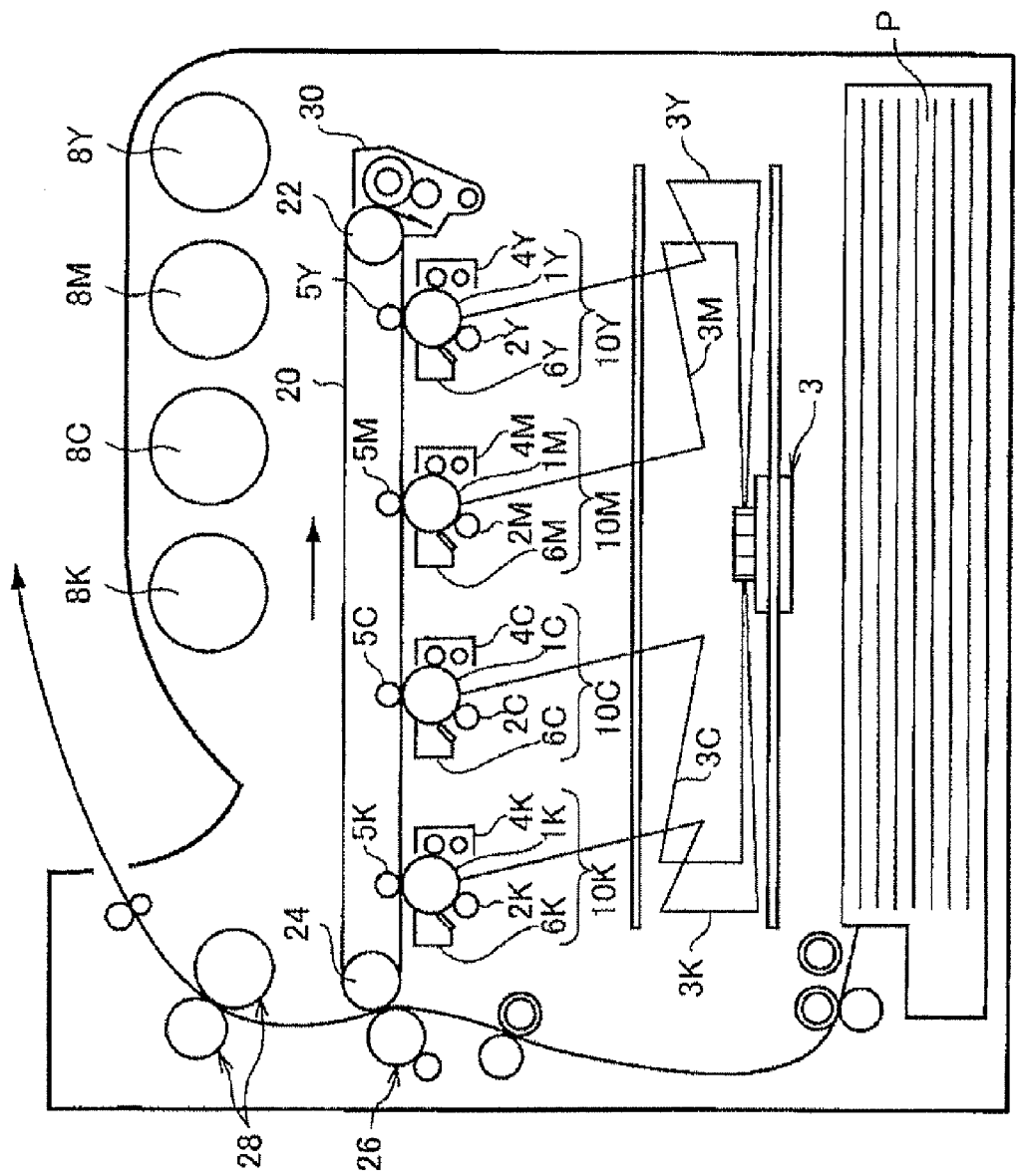
FIG. 1 is a schematic configuration view showing an example of an image forming apparatus according to an exemplary embodiment.

Hereinafter, an exemplary embodiment which is an example of the invention will be described in detail.

Polyester Resin for a Toner

The polyester resin for a toner according to the exemplary embodiment is a polyester resin for a toner which is a polycondensate of a dicarboxylic acid component and an alcohol component including rosin diol that is represented by the following formula (1), and has a weight average molecular weight (Mw) of from 40000 to 150000, and a molecular weight distribution (Mw/Mn) of from 12 to 25.

The polyester resin for a toner according to the exemplary embodiment has the above configuration so that a toner which is excellent in terms of low-temperature fixing properties as well as heat storing properties can be obtained.

The reasons are not evident, but are considered to be as follows.

Here, as a method of obtaining a polyester resin having a rosin structure, a method in which a polyester resin is obtained by introducing a rosin structure into an alcohol component, and then causing polycondensation of the rosin structure with a carboxylic acid component, and a method in which a polyester resin is obtained by introducing a rosin structure into a carboxylic acid component, and then causing polycondensation of the rosin structure with an alcohol component can be considered.

Meanwhile, it is considered that there is a tendency for the reactivity of the polycondensation to be suppressed in a case in which a rosin structure is introduced into a carboxylic acid compared to a case in which a rosin structure is introduced into an alcohol component.

Therefore, since it is considered that there is a tendency for the reactivity to be enhanced and for the content of polycondensation components remaining in an unreacted state (hereinafter referred to as the "residual monomers") to be suppressed when a polyester resin is obtained by introducing a rosin structure into an alcohol component, and then causing polycondensation of the rosin structure with a carboxylic acid component, deterioration of heat storing properties caused by the residual monomers is suppressed in a case in which the polyester resin is used for an electrostatic charge image developing toner (hereinafter sometimes referred to as the "toner").

In addition, a polyester resin exhibiting the above weight average molecular weight (Mw) and molecular weight distribution (Mw/Mn) indicates that polycondensates having a variety of molecular weights, such as high-molecular-weight polycondensates or low-molecular-weight polycondensates for which a polycondensation reaction ends in the middle, are widely distributed and coexist at a weight average molecular weight (Mw) in a range of from 40000 to 150000.

In addition, since it is considered that there is a tendency for the viscosity of the polyester resin to be easily decreased due to the low-molecular-weight polycondensates during heating, the low-temperature fixing properties of the toner are realized.

From the above, the polyester resin for a toner according to the exemplary embodiment realizes a toner which is excellent in terms of heat storing properties and low-temperature fixing properties.

Hereinafter, the polyester resin for a toner according to the exemplary embodiment will be described in detail.

The polyester resin for a toner according to the exemplary embodiment is a polyester resin for a toner which is a polycondensate of a dicarboxylic acid component and an alcohol component including rosin diol that is represented by the following formula (1), and has a weight average molecular weight (Mw) of 40000 to 150000, and a molecular weight distribution (Mw/Mn) of 12 to 25.

Firstly, the alcohol component will be described.

Alcohol Component

The alcohol component includes rosin diol represented by the following formula (1).

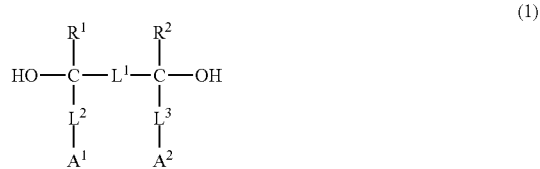

In the formula (1), $R^1$ and $R^2$ each independently represents hydrogen or a methyl group. $L^1$, $L^2$, and $L^3$ each independently represents a divalent linking group selected from a group consisting of a carbonyl group, a carboxyl group, an ether group, a sulfonyl group, a chain-like alkylene group which may have a substituent, a cyclic alkylene group which may have a substituent, an arylene group which may have a substituent, and combinations thereof, and $L^1$ and $L^2$ or $L^1$ and $L^3$ may form a ring. $A^1$ and $A^2$ represent a rosin ester group.

Examples of a chain-like alkylene group represented by $L^1$, $L^2$, and $L^3$ include alkylene groups having from 1 to 10 carbon atoms.

Examples of a cyclic alkylene group represented by $L^1$, $L^2$, and $L^3$ include cyclic alkylene groups having from 3 to 7 carbon atoms.

Examples of an arylene group represented by $L^1$, $L^2$, and $L^3$ include phenylene groups, naphthylene groups, and anthracene groups.

Examples of a substituent in the chain-like alkylene group, the cyclic alkylene group, and the arylene group include alkyl groups having 1 to 8 carbon atoms, aryl groups, and the like, and linear, branched, or cyclic alkyl groups are preferable. Specific examples thereof include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-methylhexyl group, a 2-ethylhexyl group, a cyclopentyl group, a cyclohexyl group, a phenyl group, and the like.

Rosin dial represented by the formula (1) contains two rosin ester groups in a molecule.

Meanwhile, in the exemplary embodiment, the rosin ester group refers to a residue obtained by removing a hydrogen atom from a carboxyl group included in rosin.

The rosin dial represented by the formula (1) may be synthesized using a well-known method, and the rosin dial is synthesized through, for example, a reaction between rosin and a bifunctional epoxy compound.

Hereinafter, a synthesis scheme of rosin dial will be shown as an example.

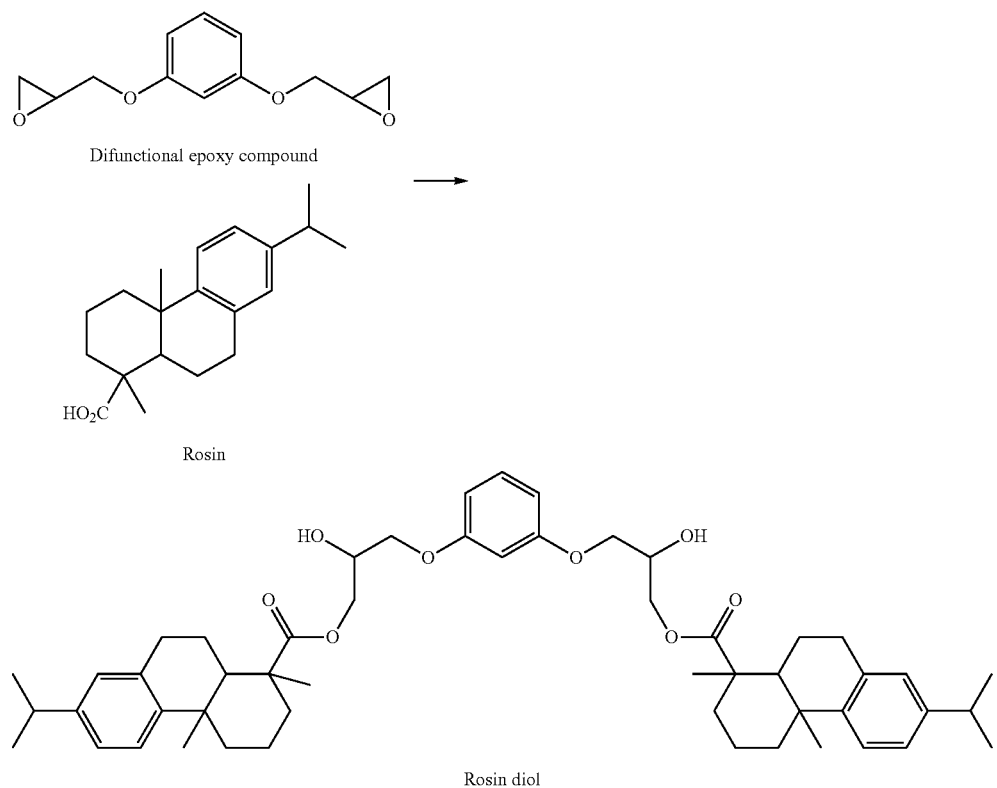 [SMILES: c1cc(OCC2CO2)cc(OCC2CO2)c1 ; CC(C)c1ccc2c(c1)CCC1C(C)(C(=O)O)CCCC21C ; CC(C)c1ccc2c(c1)CCC1C(C)(C(=O)OCC(O)COc3cccc(OCC(O)COC(=O)C4(C)CCCC5(C)c6ccc(C(C)C)cc6CCC45)c3)CCCC21C]

The bifunctional epoxy compound includes two epoxy groups in a molecule, and examples thereof include diglycidyl ethers of aromatic-based diols, diglycidyl ethers of aromatic-based dicarboxylic acids, diglycidyl ethers of aliphatic-based diols, diglycidyl ethers of alicyclic diols, alicyclic epoxides, and the like.

Representative examples of the diglycidyl ethers of aromatic-based diols include, as an aromatic dial component, bisphenol A and derivatives of bisphenol A such as polyalkylene oxide adducts of bisphenol A; bisphenol F and derivatives of bisphenol F such as polyalkylene oxide adducts of bisphenol F; bisphenol S and derivatives of bisphenol S such as polyalkylene oxide adducts of bisphenol S; resorcinol, t-butylcatechol, biphenol, and the like.

Representative examples of the diglycidyl ethers of aromatic-based dicarboxylic acid include, as an aromatic dicarboxylic acid component, terephthalic acid, isophthalic acid, phthalic acid, and the like.

Representative examples of the digylcidyl ethers of aliphatic-based diols include, as an aliphatic diol component, ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, polytetramethylene glycol, and the like.

The representative examples of the diglycidyl ethers of alicyclic diols include, as an alicyclic diol component, hydrogenated bisphenol A and derivatives of hydrogenated bisphenol A, such as polyalkylene oxide adducts of hydrogenated bisphenol A, cyclohexanedimethanol, and the like.

The representative examples of the alicyclic epoxides include limonene dioxide.

The epoxy group-containing compound is obtained through, for example, a reaction between a diol component and epihalohydrin, but may be polycondensated depending on the quantitative ratio thereof so as to increase the molecular weight.

The reaction between rosin and the bifunctional epoxy compound proceeds mainly due to a ring-opening reaction between a carboxyl group in the rosin and an epoxy group in the bifunctional epoxy compound. At this time, the reaction temperature is preferably equal to or higher than the melting temperature of both components or a temperature at which mixing is possible, and, specifically, is generally in a range from 60° C. to 200° C. During the reaction, a catalyst that accelerates the ring-opening reaction of the epoxy group may be added.

The catalyst includes amines, such as ethylenediamine, trimethylamine, and 2-methylimidazole; quaternary ammonium salts, such as triethylammonium bromide, triethylammonium chloride, and butyltrimethylammonium chloride; triphenylphosphine, and the like.

The reaction can be carried out using a variety of methods, and, for example, generally, in the case of a batch type, rosin and the bifunctional epoxy compound are fed into a heatable flask having a cooling tube, a stirring apparatus, an inert gas inlet, a thermometer, and the like, heated, and melted, and the progress of the reaction is tracked through sampling of reaction products. The degree of progress of the reaction is confirmed mainly through a decrease in the acid value, and the reaction terminates at a stoichiometric reaction end point or when the progress of the reaction reaches near the stoichiometric reaction end point.

The reaction ratio between the rosin and the bifunctional epoxy compound is not particularly limited, but the molar ratio between the rosin and the bifunctional epoxy compound is preferably from 1.5 mol to 2.5 mol of the rosin with respect to 1 mol of the bifunctional epoxy compound in the reaction.

Rosin used in the exemplary embodiment is a collective term for resin acids obtained from plants, and the main component is a natural product-derived substance including abietic acid which is one of tricyclic diterpenes and isomers thereof. Examples of the specific components include palustric acid, neoabietic acid, pimaric acid, dehydroabietic acid, isopimaric acid, sandaracopimaric acid, and the like, and rosin used in the exemplary embodiment is a mixture thereof.

Rosin is roughly classified into three kinds of a tall rosin for which pulp is used as a raw material, a gum rosin for which turpentine is used as a raw material, and a wood rosin for which the stubble of pine is used as a raw material according to sampling methods.

Rosin used in the exemplary embodiment is preferably a gum rosin and/or a tall rosin due to easy procurement. The rosins are preferably purified. A high-molecular-weight substance which is considered to be generated from a peroxide of a resin acid or unsaponifiable matter included in one of unpurified rosins is removed from the unpurified rosin so as to obtain a purified rosin. The purifying method is not particularly limited, and examples thereof include a variety of well-known purifying methods. Specific examples include methods such as distillation, recrystallization, and extraction. Industrially, purification through distillation is preferable. Distillation is generally carried out at from 200° C. to 300° C. at a pressure of 6.67 kPa or less, the temperature and the pressure are selected in consideration of distillation time. Recrystallization is carried out by, for example, dissolving unpurified rosin in a good solvent, then, distilling the solvent away so as to prepare a concentrated solution, and adding a poor solvent to the solution. Examples of the good solvent include aromatic hydrocarbons, such as benzene, toluene, and xylene; chlorinated hydrocarbons, such as chloroform; alcohols, such as lower alcohols, ketones, such as acetone; acetic acid esters, such as ethyl acetate; and the like. Examples of the poor solvent include hydrocarbon-based solvents, such as n-hexane, n-heptane, cyclohexane, and isooctane. Extraction is a method of obtaining purified rosin by, for example, preparing an aqueous alkali solution of unpurified rosin using an alkali water, extracting the insoluble unsaponifiable matter included therein using an organic solvent, and neutralizing a water layer.

The rosin according to the exemplary embodiment may be a disproportionated rosin. The disproportionated rosin is a mixture of main components of dehydroabietic acid and dihydroabietic acid in which unstable conjugated double bonds in the molecule are lost by heating a rosin including abietic acid as a main component at a high temperature in the presence of a disproportionation catalyst.

Examples of the disproportionation catalyst include a variety of well-known catalysts, such as supported catalysts, such as palladium carbon, rhodium carbon, and platinum carbon; metal powders, such as nickel and platinum; iodine and iodized products, such as iron iodide; phosphrous compound and the like. The amount of the catalyst used is generally from 0.01% by weight to 5% by weight, and preferably from 0.01% by weight to 1% by weight with respect to the rosin, and the reaction temperature is from 100° C. to 300° C., and preferably from 150° C. to 290° C. Meanwhile, the amount of the dehydroabietic acid may be controlled by, for example, adding the above range of dehydroabietic acid that is isolated using a method in which the dehydroabietic acid is crystallized from a disproportionated rosin as an ethanolamine salt (J. Org. Chem., 31, 4246 (1996)).

The rosin in the exemplary embodiment may be a hydrogenated rosin. The hydrogenated rosin includes tetrahydroabietic acid and dihydroabietic acid as major components, and is obtained by removing the unstable conjugated double bonds in the molecule using a well-known hydrogenation reaction. The hydrogenation reaction is caused by heating unpurified rosin in the presence of a hydrogenation catalyst at a hydrogen pressure of, generally, from 10 $kg/cm^2$ to 200 $kg/cm^2$, and preferably from 50 $kg/cm^2$ to 150 $kg/cm^2$. Examples of the hydrogenation catalyst include a variety of well-known catalysts, such as supported catalysts, such as palladium carbon, rhodium carbon, and platinum carbon; metal powders, such as nickel and platinum; iodine and iodized products, such as iron iodide; and the like. The amount of the catalyst used is generally from 0.01% by weight to 5% by weight, and preferably from 0.01% by weight to 1.0% by weight with respect to the rosin, and the reaction temperature is from 100° C. to 300° C., and preferably from 150° C. to 290° C.

For the disproportionated rosin and the hydrogenated rosin, the purifying process may be provided before and after a disproportionation treatment or a hydrogenation treatment.

In addition, the rosin in the exemplary embodiment may be also a polymerized rosin obtained through polymerization of rosin, an unsaturated carboxylic acid-modified rosin obtained by adding an unsaturated carboxylic acid to rosin, or a phenol-modified rosin. Meanwhile, examples of the unsaturated carboxylic acid used for preparation of the unsaturated carboxylic acid-modified rosin include maleic acid, maleic acid anhydride, fumaric acid, acrylic acid, methacrylic acid, and the like. The unsaturated carboxylic acid-modified rosin is obtained by modification using, generally, approximately 1 part by weight to 30 parts by weight of unsaturated carboxylic acid with respect to 100 parts by weight of raw material rosin.

The rosin in the exemplary embodiment is preferably, among the above rosins, a purified rosin, a disproportionated rosin, or a hydrogenated rosin, and they may be used singly or in any mixture.

Hereinafter, exemplary compounds of rosin diol which may be preferably used in the exemplary embodiment and is represented by the formula (1) will be shown, but the rosin diol is not limited thereto.

(5)
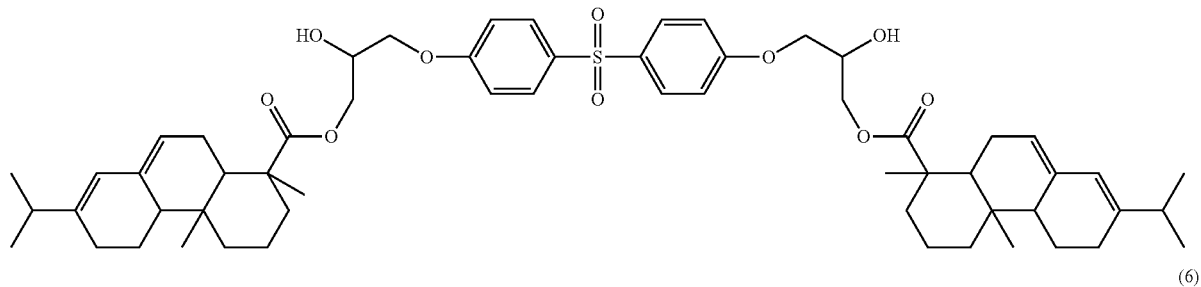
(6)
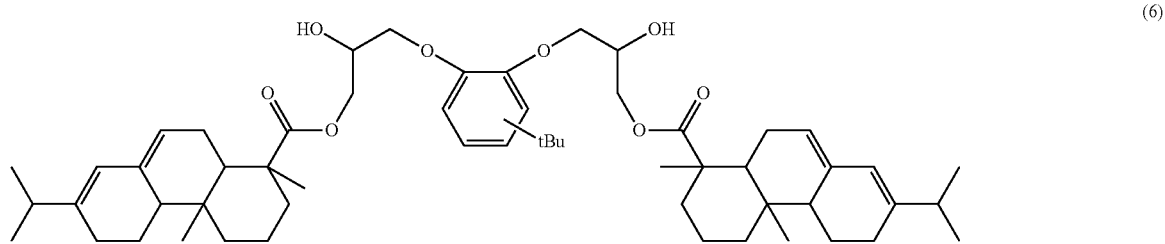
(7)
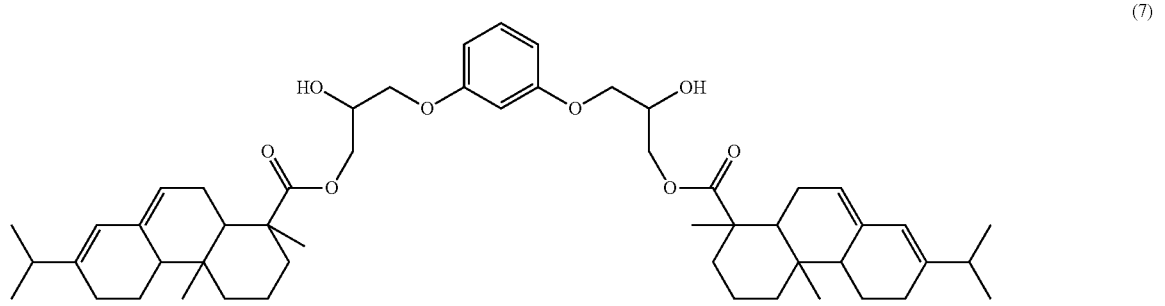
(8)
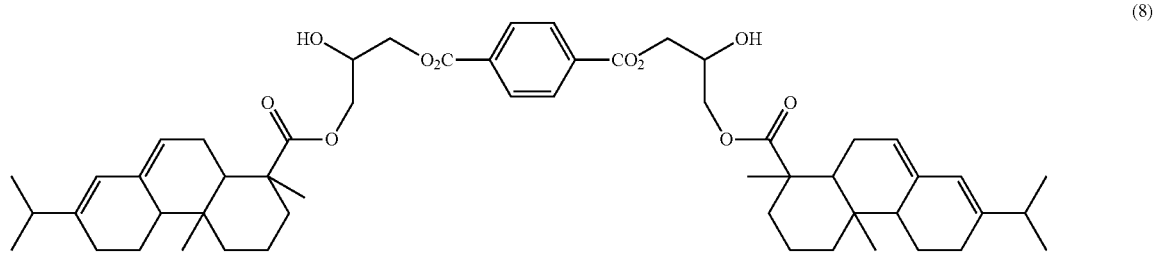
(9)
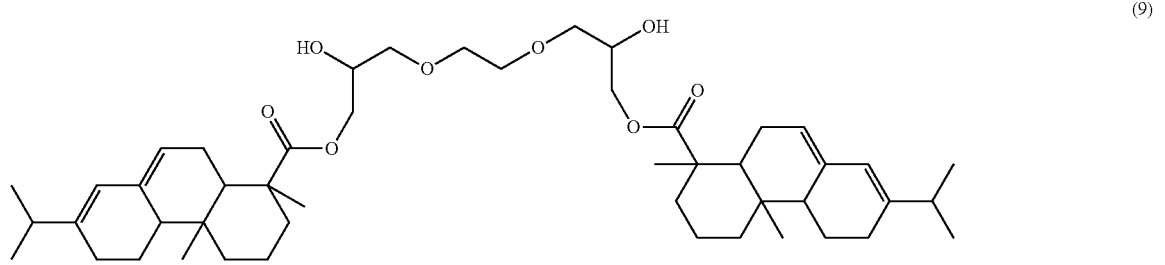
(10)
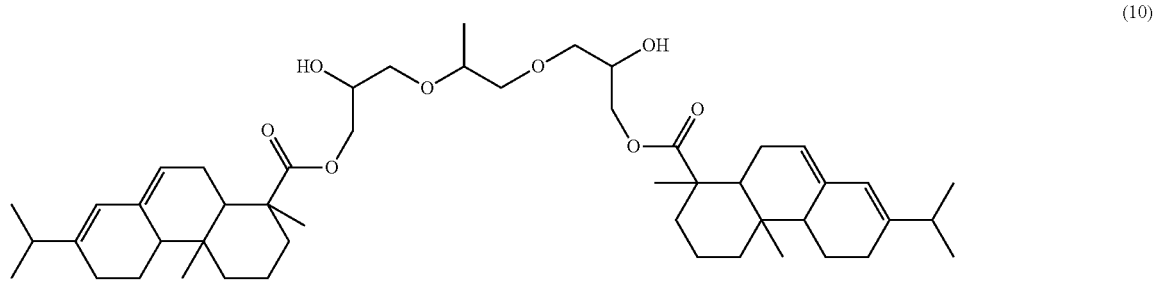

-continued
(12)
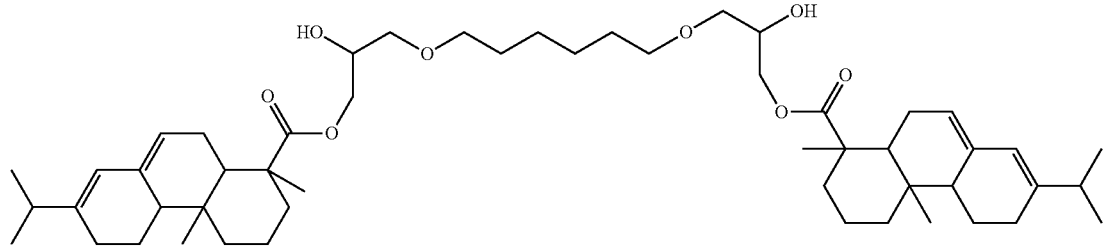
(13)
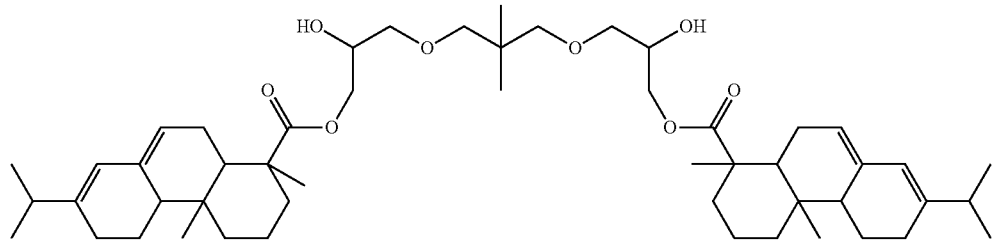
(14)
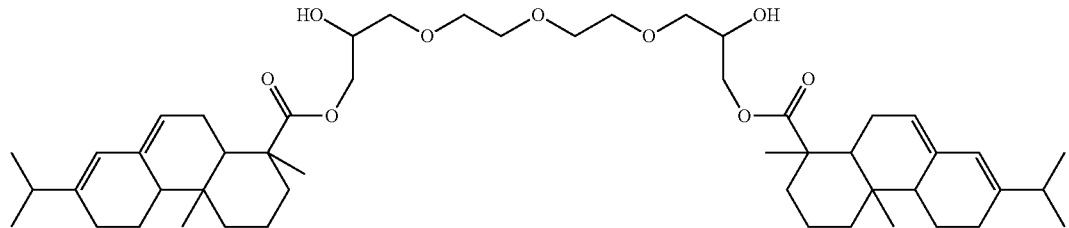
(15)
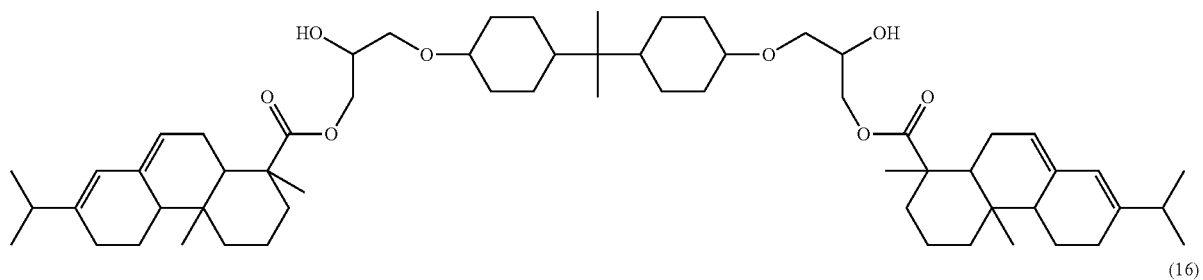
(16)
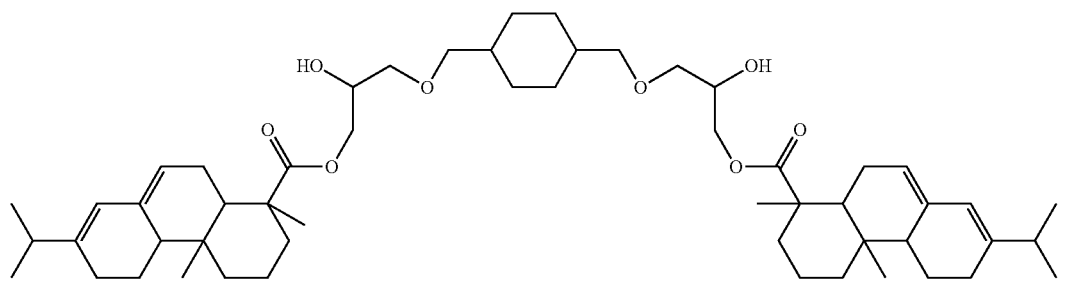
(17)
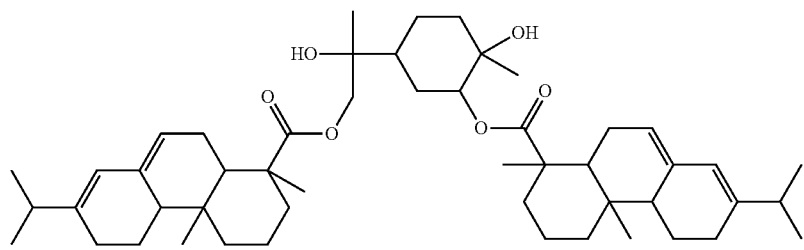

(18)
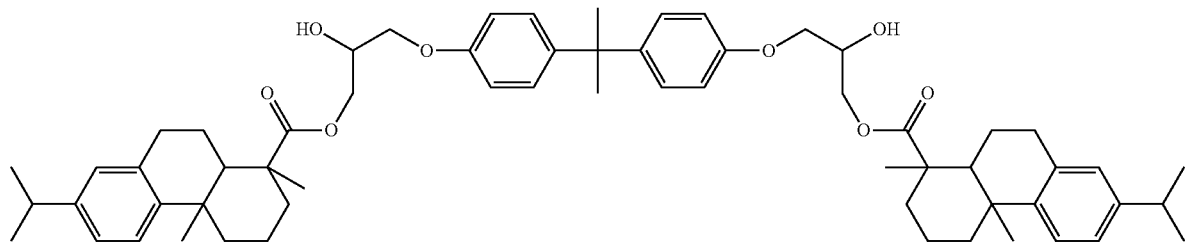
(19)
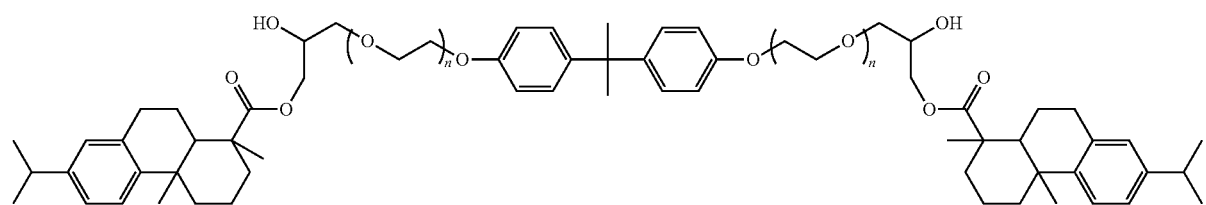
(20)
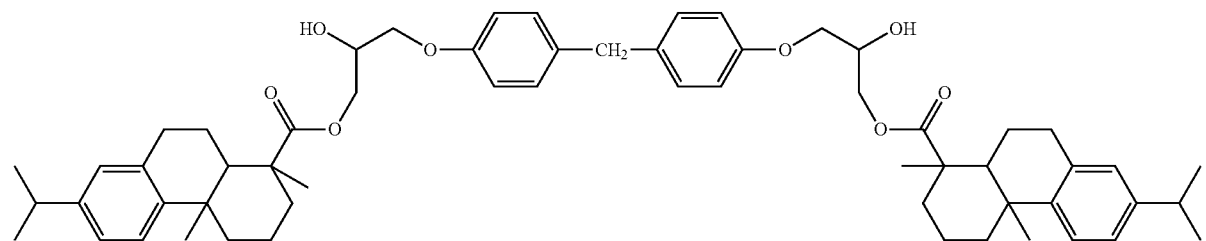
(21)
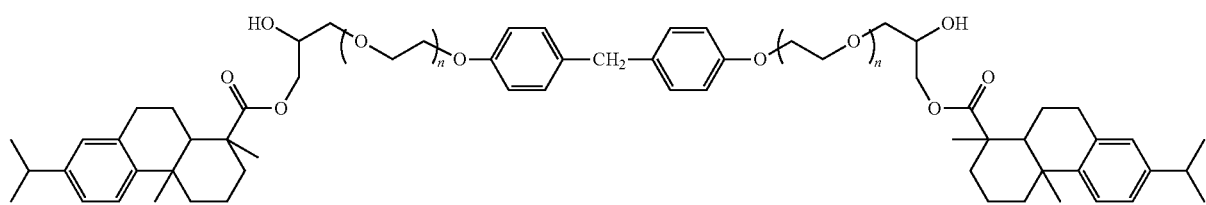
(22)
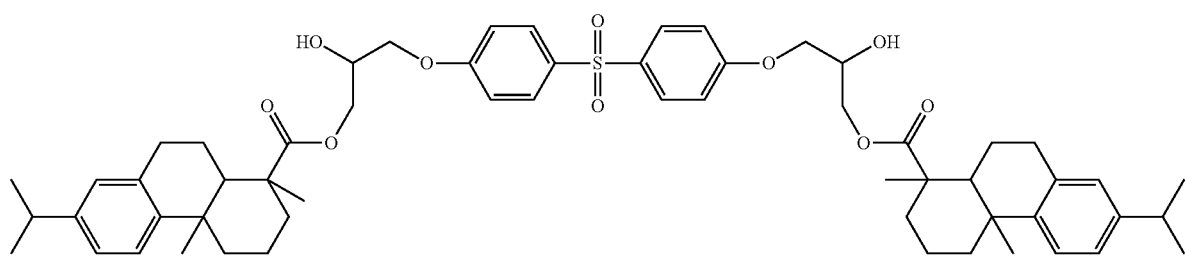
(23)
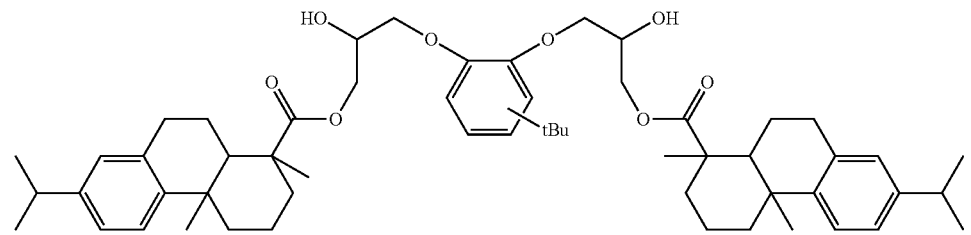

(24)
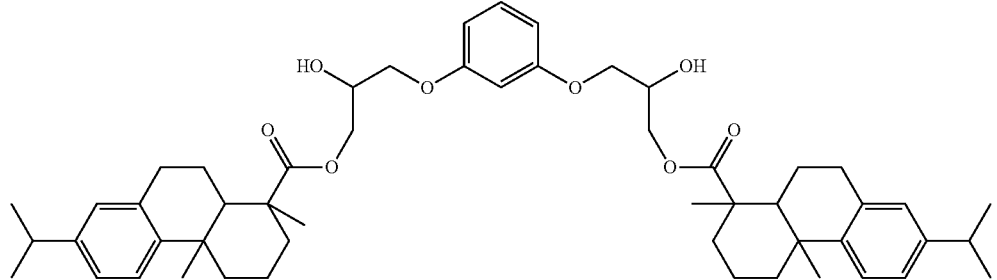
(25)
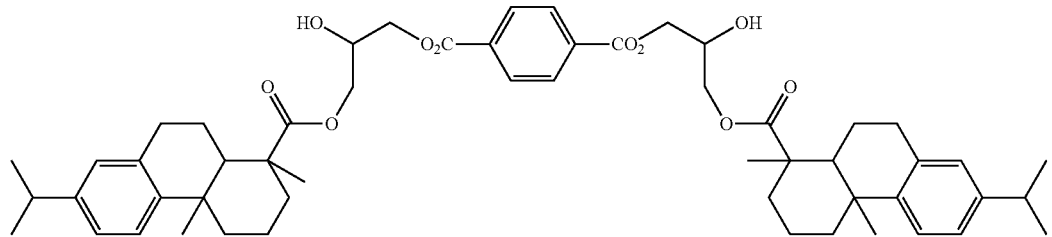
(26)
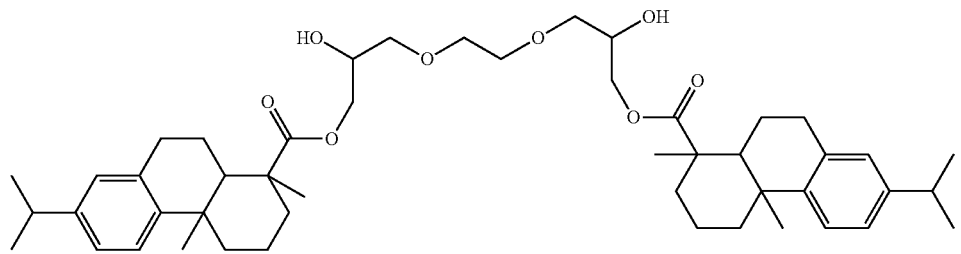
(27)
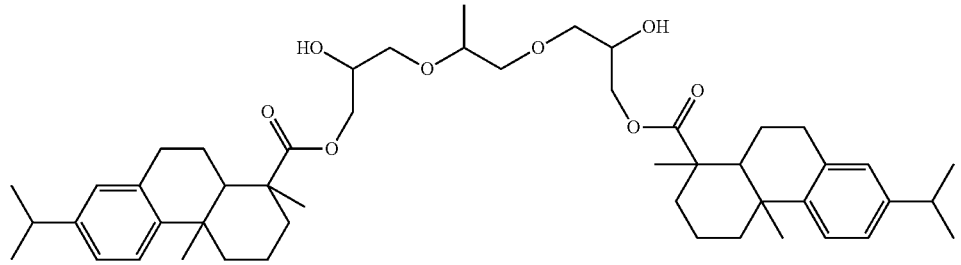
(28)
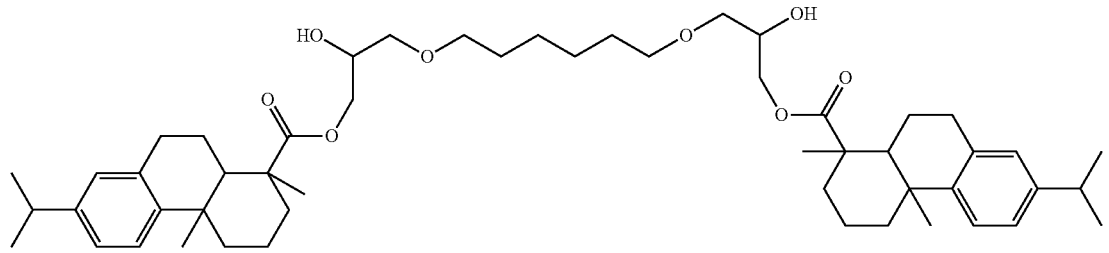
(29)
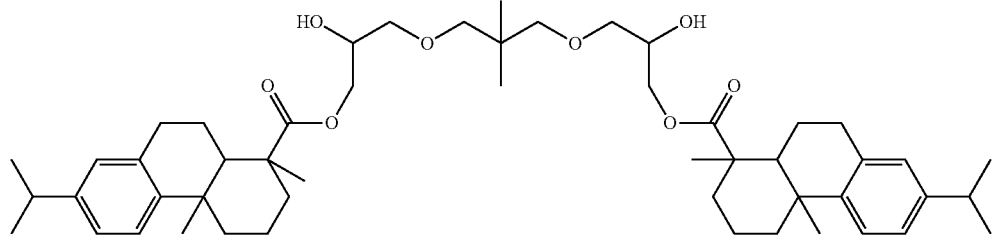

-continued
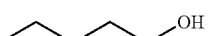
(30)
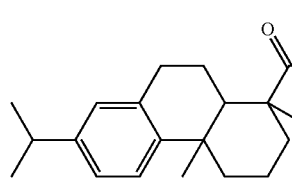
(31)
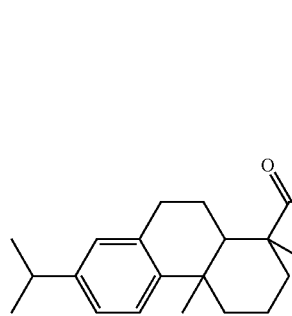 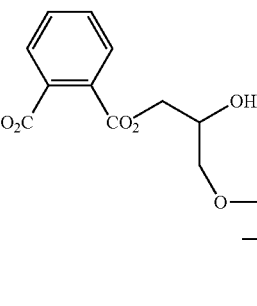
(32)
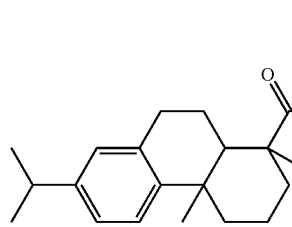 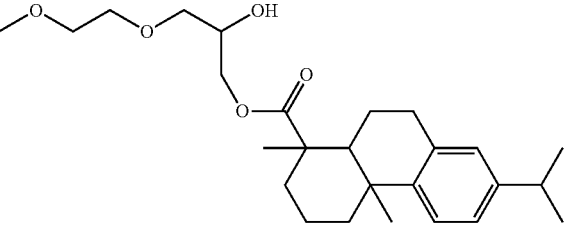
(33)
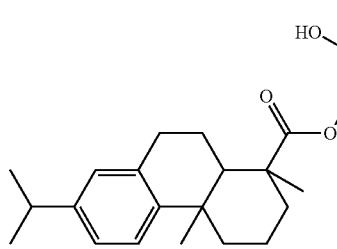 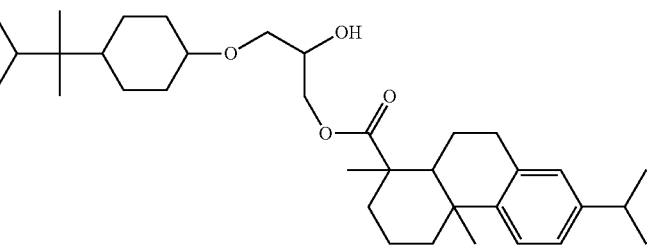
(34)
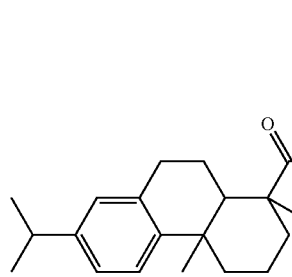 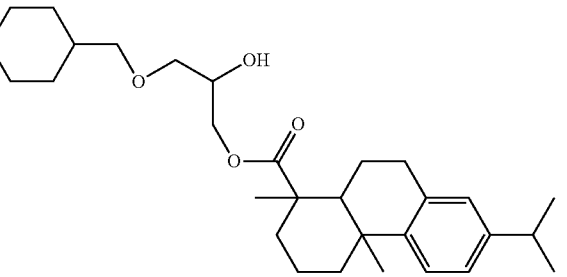
(35)
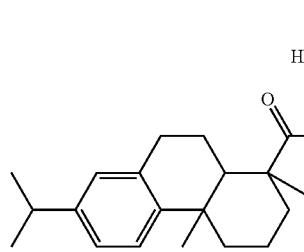 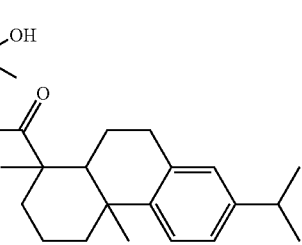

-continued
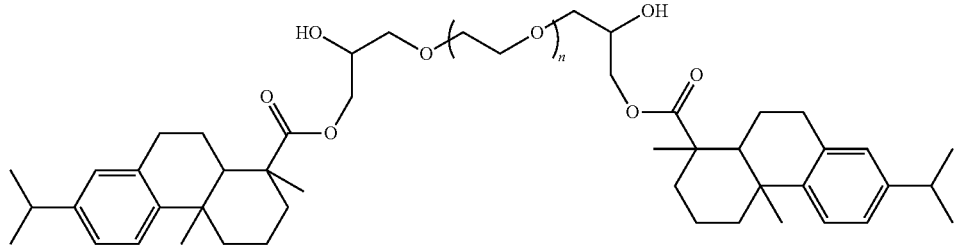
(36)
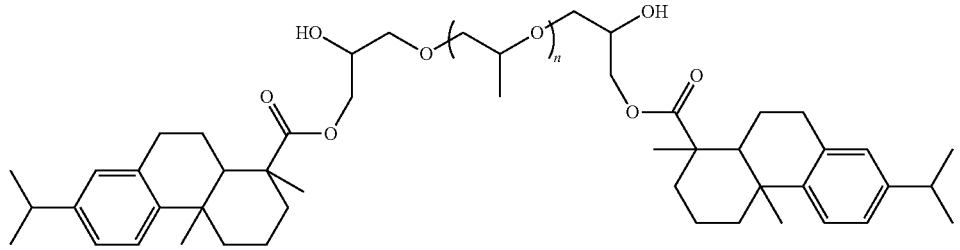
(37)
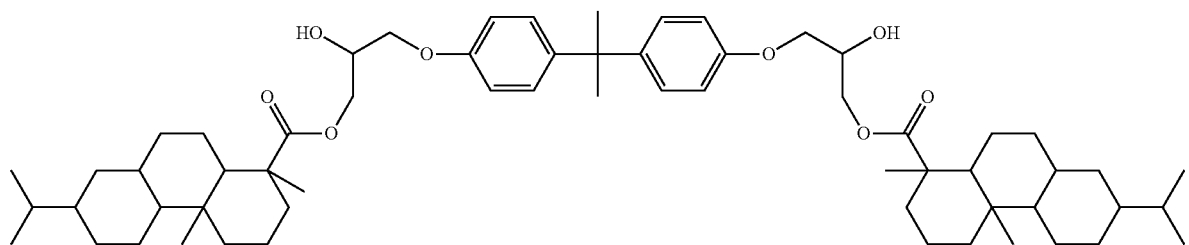
(38)
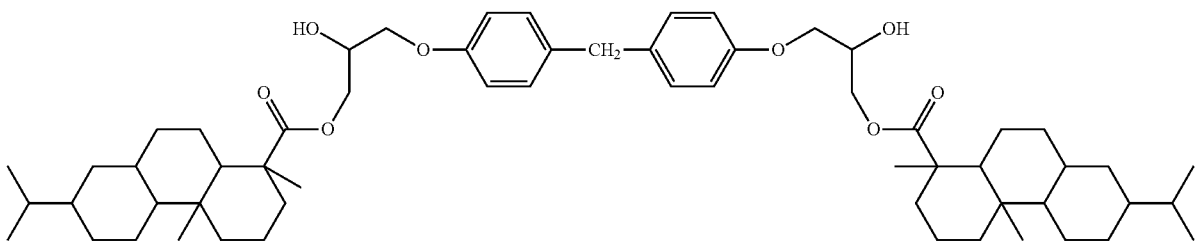
(39)
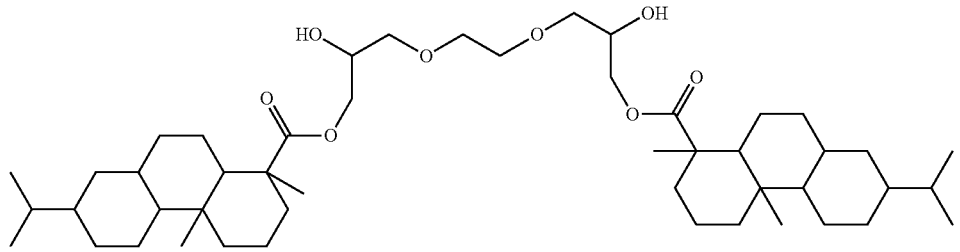
(40)
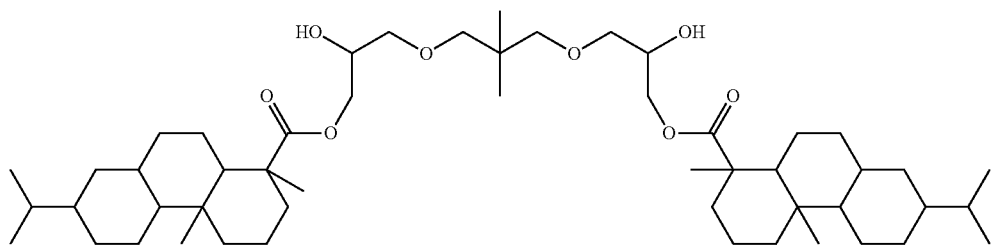
(41)

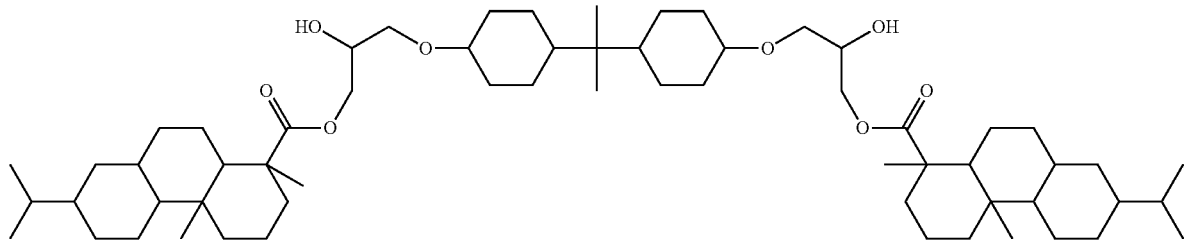

Meanwhile, in the exemplary compounds of rosin diol, n indicates an integer of 1 or more.

In the exemplary embodiment, alcohols other than the rosin dial represented by the formula (1) may be jointly used as the alcohol component. The content of the rosin diol represented by the formula (1) is preferably from 10 mol % to 100 mol %, and more preferably from 20 mol % to 90 mol % in the alcohol component from the viewpoint of the heat storing properties and low-temperature fixing properties of a toner.

As the alcohol other than the rosin dial, at least one selected from a group consisting of aliphatic dials and aromatic diols may be used as long as the toner performances do not degrade.

Specific examples of the aliphatic dials include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 1,6-hexanedial, 2-butyl-2-ethylpropane-1,3-diol, 2-ethyl-1,3-hexanediol, 3-methyl-1,5-pentanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, dimer diol, 3-hydroxy-2,2-dimethylpropyl-3-hydroxy-2,2-dimethylpropanoate, diethylene glycol, triethylene glycol, polyethylene glycol, dipropylene glycol, polypropylene glycol, and the like, but the aliphatic diol is not limited thereto.

The aromatic diol includes bisphenol A ethylene oxide adducts, bisphenol A propylene oxide adducts, bisphenol A butylene oxide adducts, and the like, but is not limited thereto.

They may be used singly or in combination with two or more kinds.

Dicarboxylic Acid Component

Examples of the dicarboxylic acid component include at least one selected from a group consisting of aromatic dicarboxylic acids and aliphatic dicarboxylic acids. Specific examples thereof include aromatic dicarboxylic acids, such as phthalic acid, isophthalic acid, terephthalic acid, 1,4-naphthalene dicarboxylic acid, and 2,6-naphthalene dicarboxylic acid; aliphatic dicarboxylic acids, such as oxalic acid, malonic acid, maleic acid, fumaric acid, citraconic acid, itaconic acid, glutaconic acid, succinic acid, adipic acid, sebacic acid, azelaic acid, dimer acid, branched chain alkyl succinic acid having from 1 to 20 carbon atoms, and branched chain alkenyl succinic acid having from 1 to 20 carbon atoms; anhydrides of the above acids; alkyl (having from 1 to 3 carbon atoms) esters of the above acids; and the like.

Among the above, aromatic carboxylic acid compounds are preferable from the viewpoint of the durability and fixing properties of a toner and the dispersibility of a colorant.

In addition, the dicarboxylic acid component preferably includes at least one kind of unsaturated dicarboxylic acid among the above dicarboxylic acid components.

When the dicarboxylic acid component includes at least one kind of unsaturated dicarboxylic acid, there is a tendency for the polyester resin for a toner according to the exemplary embodiment to easily obtain a weight average molecular weight (Mw) of from 40000 to 150000 and a molecular weight distribution (Mw/Mn) of from 12 to 25.

This is considered to be because there is a tendency for the synthesized polyester resin for a toner to have a three-dimensional crosslinked form since radical polymerization originating from the unsaturated group in the unsaturated dicarboxylic acid proceeds in parallel with a polycondensation reaction.

Here, the unsaturated dicarboxylic acid refers to a compound having at least one unsaturated group in a molecule, and the compound may be an acid anhydride.

Specific examples thereof include fumaric acid, maleic acid, maleic acid anhydride, itaconic acid, citraconic acid, mesaconic acid, glutaconic acid, traumatic acid, and the like, fumaric acid, maleic acid, maleic acid anhydride, and itaconic acid are preferable, and fumaric acid, maleic acid, and maleic acid anhydride are more preferable.

In a case in which fumaric acid, maleic acid, maleic acid anhydride, or itaconic acid is used as the unsaturated dicarboxylic acid, it is considered that, since there is a tendency for the glass transition temperature to increase compared to other unsaturated dicarboxylic acids, heat storing properties and low-temperature fixing properties may be easily achieved.

As the dicarboxylic acid component, the unsaturated dicarboxylic acid component and a dicarboxylic acid other than the unsaturated dicarboxylic acid may be preferably used in combination from the viewpoint of manufacturing stability.

The content of the unsaturated dicarboxylic acid in the dicarboxylic acid component may be, in the carboxylic acid component, from 5 mol % to 80 mol %, is preferably from 10 mol % to 70 mol %, and more preferably from 25 mol % to 60 mol %.

Manufacturing of the Polyester Resin for a Toner

The polyester resin for a toner according to the exemplary embodiment is prepared through a well-known conventional manufacturing method using the dicarboxylic acid component and the alcohol component including the rosin diol represented by the formula (1) as raw materials.

As the reaction method, any of an ester exchange reaction and a direct esterification reaction may be applied. In addition, polycondensation may be accelerated using a method in which the pressure is applied so as to increase the reaction temperature, a depressurization method, or a method in which inert gas is made to flow at a normal pressure. For some reactions, a well-known conventional reaction catalyst, such as at least one metallic compound selected from antimony, titanium, tin, zinc, aluminum, and manganese, may be used so as to accelerate the reactions. The addition amount of the reaction catalyst is preferably from 0.01 part by weight to 1.5 parts by weight, and more preferably from 0.05 part by weight to 1.0 part by weight with respect to 100 parts by weight of the acid component and the alcohol component in total. The reaction is carried out preferably at a temperature of, for example, from 180° C. to 300° C.

Hereinafter, an example of the reaction scheme between the rosin diol represented by the formula (1) and the dicarboxylic acid component will be shown.

Meanwhile, in the structural formula that represents the polyester resin, the portion surrounded by dotted lines corresponds to the rosin ester group according to the exemplary embodiment.

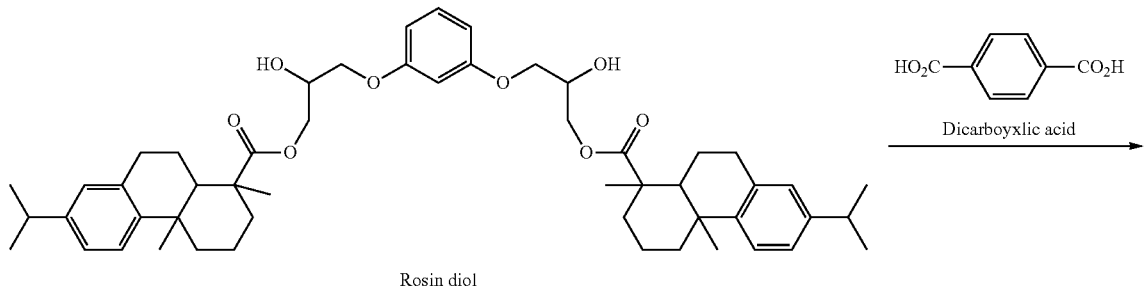

Rosin diol

Dicarboyxlic acid

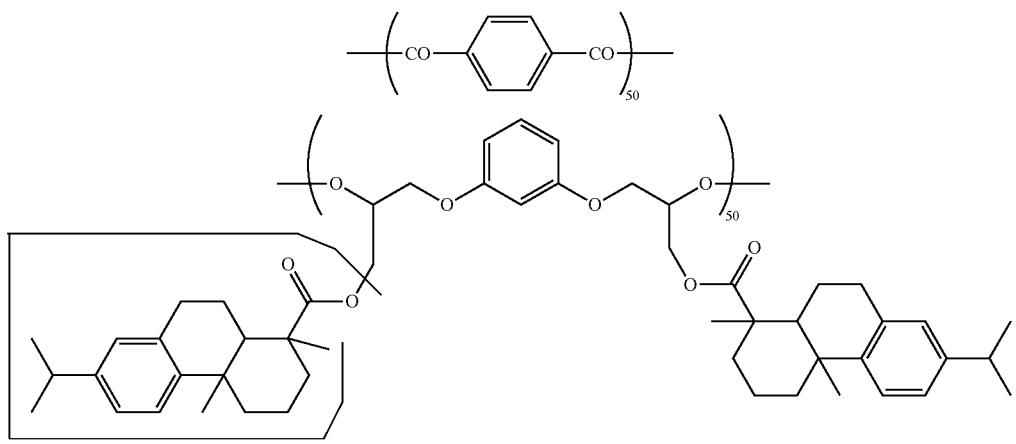

Polyester resin

Meanwhile, when the polyester resin for a toner according to the exemplary embodiment is hydrolyzed, the polyester resin decomposes into the following monomers. Since the polyester is a condensate of 1:1 of the carboxylic acid and the diol, the components of the resin is assumed from decomposed materials.

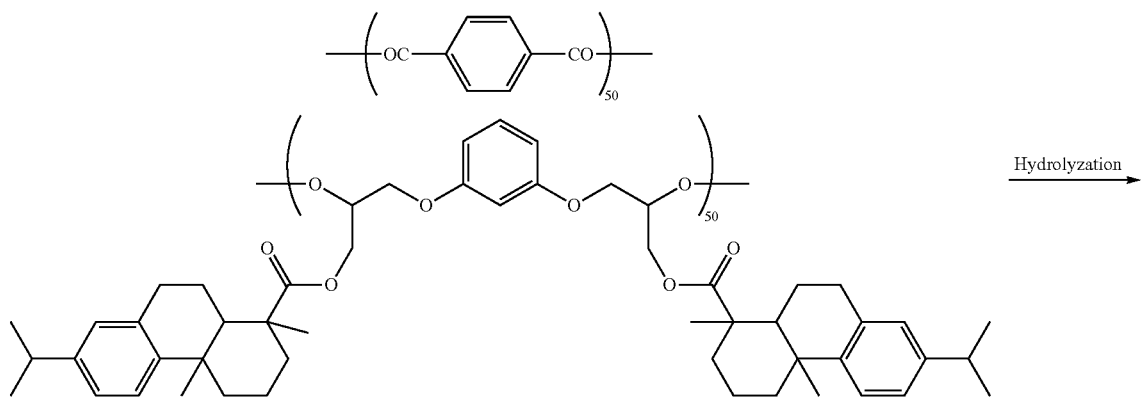

Hydrolyzation

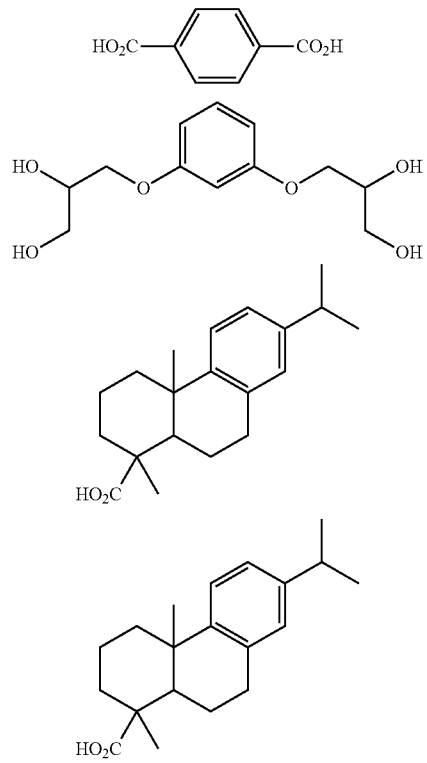

Characteristics of the Polyester Resin for a Toner

The weight average molecular weight (Mw) of the polyester resin for a toner according to the exemplary embodiment is from 40000 to 150000, and the molecular weight distribution (Mw/Mn) is from 12 to 25.

The weight average molecular weight (Mw) is from 40000 to 150000, preferably from 45000 to 100000, and more preferably from 50000 to 90000.

The weight average molecular weight is preferably 40000 or more from the viewpoint of heat storing properties.

In addition, the weight average molecular weight is preferably 150000 or less from the viewpoint of low-temperature fixing properties.

The number average molecular weight (Mn) may be from 2000 to 7000, is preferably from 3000 to 6500, and more preferably from 3500 to 6000 from the viewpoints described above.

The weight average molecular weight Mw and the number average molecular weight Mn are measured using two columns of a "HLC-8120GPC" and a "SC-8020 (manufactured by Tosoh Corporation, 6.0 mm ID×15 cm)," and tetrahydrofuran (THF) as an eluent. The experimental conditions are a sample concentration of 0.5%, a flow rate of 0.6 ml/min, an amount of sample injection of 10 μl and a measurement temperature of 40° C., and the experiment is conducted using an RI detector. In addition, calibration curves are prepared from 10 samples of "Polystyrene standard sample TSK standard" manufactured by Tosoh Corporation: "A-500," "F-1," "F-10," "F-80," "F-380," "A-2500," "F-4," "F-40," "F-128," and "F-700".

The molecular weight distribution (Mw/Mn) is from 12 to 25, preferably from 13 to 25, and more preferably from 14 to 20 from the viewpoints described above.

The softening point is preferably from 80° C. to 160° C., and more preferably from 90° C. to 150° C. from the viewpoint of the fixing properties, storing properties, and durability of a toner.

The softening point is measured as a temperature that corresponds to half the height from an effusion-start point to an effusion-end point when 1 cm$^3$ of a sample is melted and effused using a flow tester CFT-500 (manufactured by Shimadzu Corporation) under conditions of a pore diameter of a dice of 0.5 mm, a pressurization load of 0.98 MPa (10 kg/cm$^2$), and a rate of temperature increase set to 1° C./min.

The glass transition temperature may preferably be from 35° C. to 80° C., and is preferably from 40° C. to 70° C. from the viewpoint of fixing properties, storing properties, and durability.

In addition, heat storing properties are considered to be secured at a glass transition temperature of 55° C. or higher.

The glass transition temperature is measured using a "DSC-20" (manufactured by Seiko Denshi Kogyo Co., Ltd.) by heating 10 mg of a sample at a constant rate of temperature increase (10° C./min).

The softening point and the glass transition temperature are easily adjusted by adjusting the raw material monomer composition, a polymerization initiator, the molecular weight, the amount of a catalyst, and the like, and selecting reaction conditions.

The acid value is preferably from 1 mg KOH/g to 50 mg KOH/g, and more preferably from 3 mg KOH/g to 30 mg KOH/g from the viewpoint of the charging properties of the electrostatic charge image developing toner.

The acid value is measured according to JIS K0070 using a neutralization titration method. That is, an appropriate amount of a sample is sampled, 100 ml of a solvent (a liquid mixture of diethyl ether and ethanol) and several drops of an indicator (phenolphthalein solution) are added, and the solution is shaken in a water bath until the sample dissolves. The solution is titrated using a 0.1 mol/l potassium hydroxide ethanol solution, and a point in time when the light red of the indicator remains for 30 seconds is used as the end point. The acid value is calculated using $A=(B \times f \times 5.611)/S$ in which A represents the acid value, S (g) represents the amount of the sample, B (ml) represents the 0.1 mol/l potassium hydroxide ethanol solution, and if represents the factor of the 0.1 mol/l potassium hydroxide ethanol solution.

Meanwhile, the polyester resin for a toner according to the exemplary embodiment may be a modified polyester resin. Examples of modified polyester resins include polyester resins grafted or blocked using phenol, urethane, epoxy, or the like through the methods described in JP-A-11-133668, JP-A-10-239903, and JP-A-8-20636.

Electrostatic Charge Image Developing Toner

The electrostatic charge image developing toner according to the exemplary embodiment is configured to include the polyester resin for a toner according to the exemplary embodiment.

Hereinafter, the toner according to the exemplary embodiment will be described in detail.

The toner according to the exemplary embodiment is configured to have, for example, toner particles and external additives according to necessity.

Toner Particles

The toner particles will be described.

The toner particles are configured to include a binder resin, according to necessity, a colorant, a release agent, and other additives.

Binder Resin

An amorphous resin may be used as the binder resin, and the polyester resin for a toner according to the exemplary embodiment is applied as an amorphous resin.

A crystalline resin may be used in combination with an amorphous resin as the binder resin.

An amorphous resin other than the polyester resin for a toner according to the exemplary embodiment may be used in combination with the polyester resin for a toner according to the exemplary embodiment as the binder resin.

Meanwhile, the content of the polyester resin for a toner according to the exemplary embodiment is preferably 70 parts by weight or more, and more preferably 90 parts by weight or more with respect to 100 parts by weight of the entire binder resin.

Here, the amorphous resin refers to a resin which shows no clear endothermic peak in thermal analysis measurement using differential scanning calorimetry (DSC), has only a step-like endothermic change, is solid at room temperature (for example, 25° C.), and becomes thermoplastic at the glass transition temperature or higher.

Meanwhile, the crystalline resin refers to a resin which does not have a step-like endothermic change but clear endothermic peaks in differential scanning calorimetric (DSC) measurement.

Specifically, the crystalline resin means that, for example, the half-value widths of endothermic peaks are 10° C. or less when the half-value widths are measured at a rate of temperature increase of 10° C./min, and the amorphous resin refers to a resin having a half-value width of more than 10° C. or a resin in which evident endothermic peaks are not observed.

Examples of the crystalline resin include crystalline polyester resins, polyalkyene resins, long-chain alkyl(meth)acrylate resins, and the like, and crystalline polyester resins are preferable since an abrupt change in viscosity due to heating is more easily exhibited, and, furthermore, both mechanical strength and low-temperature fixing properties are satisfied.

The crystalline polyester resin is preferably, for example, a polycondensate of an aliphatic dicarboxylic acid (including an acid anhydride and an acid chloride thereof) and an aliphatic diol from the viewpoint of realizing low-temperature fixing properties.

The content of the crystalline resin is preferably from 1 part by weight to 20 parts by weight, and more preferably from 5 parts by weight to 15 parts by weight with respect to 100 parts by weight of the entire binder resin.

Meanwhile, low-temperature fixing in the exemplary embodiment means that the toner is heated so as to be fixed at approximately 120° C. or lower.

Examples of other amorphous resins include well-known binder resins, such as vinyl-based resins, such as styrene-acrylic resin, epoxy resins, polycarbonate, and polyurethane.

Colorant

The colorant may be, for example, a dye or a pigment, but a pigment is preferable from the viewpoint of light resistance or water resistance.

Examples of the colorant that may be used include well-known pigments, such as carbon black, aniline black, aniline blue, calco oil blue, chromium yellow, ultramarine blue, Du Pont oil red, quinoline yellow, methylene blue chloride, phthalocyanine blue, malachite green oxalate, lampblack, rose bengal, quinacridone, benzidine yellow, C.I. pigment red 48:1, C.I. pigment red 57:1, C.I. pigment red 122, C.I. pigment red 185, C.I. pigment red 238, C.I. pigment yellow 12, C.I. pigment yellow 17, C.I. pigment yellow 180, C.I. pigment yellow 97, C.I. pigment yellow 74, C.I. pigment blue 15:1, C.I. pigment blue 15:3, and the like.

As the colorant, a colorant which has undergone a surface treatment as necessary may be used, or a pigment dispersant may be used.

A yellow toner, a magenta toner, a cyan toner, a black toner, or the like is obtained by selecting the kind of the colorant.

The content of the colorant is preferably in a range of from 1 part by weight to 30 parts by weight with respect to 100 parts by weight of the binder resin.

Release Agent

Examples of the release agent include paraffin waxes, such as low-molecular-weight polypropylene and low-molecular-weight polyethylene; silicone resins; rosins; rice waxes; carnauba waxes, and the like. The melting temperature of the release agent is preferably from 50° C. to 100° C., and more preferably from 60° C. to 95° C.

The content of the release agent is preferably from 0.5 part by weight to 15 parts by weight, and more preferably from 1.0 part by weight to 12 parts by weight with respect to 100 parts by weight of the binder resin.

When the content of the release agent is 0.5 part by weight or more, particularly, occurrence of poor separation is prevented during oilless fixing. When the content of the release agent is 15% by weight or less, image qualities and reliance for image formation improve without deteriorating the fluidity of the toner.

Other Additives

A well-known agent may be used as a charge-controlling agent, and an azo-based metallic complex compound, a metallic complex compound of salicylic acid, and a resin-type charge-controlling agent containing a polar group may also be used.

Characteristics of Toner Particles

The toner particles may be single layer-structured toner particles or so-called core and shell-structured toner particles composed of a core portion (core particles) and a coating layer that coats the core portion (shell layer).

The core and shell-structured toner particles are preferably composed of, for example, a core portion that is configured to include a binder resin (the polyester resin according to the exemplary embodiment and a crystalline polyester resin) and other additives, such as a colorant and a release agent, as necessary; and a coating layer that is configured to include a binder resin (the polyester resin according to the exemplary embodiment).

The volume average particle diameter of the toner particles is preferably, for example, from 2.0 μm to 10 μm, and preferably from 3.5 μm to 7.0 μm.

Meanwhile, the volume average particle diameter of the toner particles is measured in the following manner: from 0.5 mg to 50 mg of a measurement sample is added to a surfactant, preferably 2 ml of a 5% by weight aqueous solution of sodium alkylbenzene sulfonate as a dispersant, and the solution is added to 100 ml to 150 ml of an electrolytic solution. A dispersion treatment is carried out for approximately 1 minute on the electrolytic solution in which the measurement sample is suspended using an ultrasonic dispersion device, and the particle size distribution of particles having a particle diameter in a range of from 2.0 μm to 60 μm is measured using a Coulter Multisizer II (manufactured by Beckman Coulter, Inc.) and an aperture having an aperture diameter of 100 μm. The number of particles being measured is set to 50,000.

A volume cumulative distribution is drawn from the small particle diameter side in particle size ranges (channels) divided by using the obtained particle size distribution, and a particle diameter at a cumulative distribution of 50% is set as the volume average particle size D50v.

The shape factor SF1 of the toner particles is preferably, for example, from 110 to 150, and preferably from 120 to 140.

Here, the shape factor SF1 is obtained using the following formula (2).

$$SF1=(ML^2/A) \times (\pi/4) \times 100 \quad (2)$$

In the above formula (2), ML represents the absolute maximum length of the toner particles, and A represents the projected area of the toner particles respectively.

Meanwhile, SF1 is digitalized mainly through analyses of microscopic images or scanning electron microscopic (SEM) images using an image analyzing apparatus, and calculated, for example, in the following manner. That is, an optical microscopic image of particles dispersed on the surface of a glass slide is scanned into a LUZEx image-analyzing apparatus using a video camera, the maximum length and projected area of 100 particles are obtained, shape factors are calculated using the above formula (2), and the average value is obtained, thereby obtaining the SF1.

External Additives

Examples of the external additives include inorganic particles, and examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, $MgSO_4$, and the like.

The surfaces of the inorganic particles as an external additive may have undergone a hydrophobizing treatment in advance. The hydrophobizing treatment is carried out by, for example, immersing the inorganic particles in a hydrophobizing treatment agent. The hydrophobizing treatment agent is not particularly limited, and examples thereof include silane-based coupling agents, silicone oil, titanate-based coupling agents, aluminum-based coupling agents, and the like. The hydrophobizing treatment agent may be used singly or in combination with two or more kinds.

The amount of the hydrophobizing treatment agent is generally, for example, from approximately 1 part by weight to approximately 10 parts by weight with respect to 100 parts by weight of the inorganic particles.

Examples of the external additives also include resin particles (resin particles of polystyrene, polymethylmethacrylate resin (PMMA), a melamine resin, and the like), a cleaning activating agent (for example, metallic salts of higher aliphatic acids which are represented by zinc stearate, or particulate powder of a fluorine-based high-molecular-weight member), and the like.

The addition amount of the external additive is preferably, for example, from 0.01 part by weight to 5 parts by weight, and more preferably from 0.01 part by weight to 2.0 parts by weight with respect to 100 parts by weight of the toner particles.

Method of Manufacturing a Toner

Hereinafter, the method of manufacturing a toner according to the exemplary embodiment will be described.

Toner particles may be manufactured using any of dry manufacturing methods (for example, a kneading and pulverizing method or the like) and wet manufacturing methods (for example, an aggregation and coalescence method, a suspension polymerization method, a melting suspension granulation method, a melting suspension method, a melting emulsification aggregation and coalescence method, or the like). The manufacturing method is not particularly limited, and a well-known manufacturing method is employed.

Hereinafter, a method will be described in which toner particles are obtained using an aggregation and coalescence method.

Specifically, toner particles are obtained in the following manner.

Meanwhile, in the following description, a method of obtaining toner particles including a colorant and a release agent will be described, but the colorant and the release agent are used as necessary. Needless to say, additives other than the colorant and the release agent may also be used.

Resin Particle Dispersion Liquid Preparation Process

Firstly, together with a resin particle dispersion liquid in which polyester resin particles (polyester resin particles for the toner according to the exemplary embodiment) are dispersed, for example, a colorant particle dispersion liquid in which colorant particles are dispersed and a release agent dispersion liquid in which release agent particles are dispersed are prepared.

Here, the resin particle dispersion liquid is prepared by, for example, dispersing the polyester resin particles in a dispersion medium using a surfactant.

Examples of the dispersion medium used in the resin particle dispersion liquid include aqueous media.

Examples of the aqueous media include water, such as distilled water and deionized water, alcohols, and the like. The aqueous media may be used singly or in combination of two or more kinds.

The surfactant is not particularly limited, and examples thereof include anionic surfactants, such as sulfate ester salt-based, sulfonate-based, phosphate ester-based, and soap-based anionic surfactants; cationic surfactants, such as amine salt-based and quaternary ammonium salt-based cationic surfactants; nonionic surfactants, such as polyethylene glycol-based, alkyl phenol ethylene oxide adduct-based, and polyol-based nonionic surfactants; and the like. Among the above, examples thereof particularly include anionic surfactants and cationic surfactants. The nonionic surfactant may be used in combination with the anionic surfactant or the cationic surfactant.

The surfactants may be used singly or in combination with two or more kinds.

For the resin particle dispersion liquid, an ordinary dispersion method using, for example, a rotary shearing homogenizer, a ball mill, a sand mill, a Dynomill which has media, or the like is used to disperse the polyester resin particles in a dispersion medium. In addition, according to the kind of resin particles being used, the resin particles may be dispersed in the resin particle dispersion liquid using, for example, a phase-transfer emulsification method.

Meanwhile, the phase-transfer emulsification method is a method in which a resin to be dispersed is dissolved in a hydrophobic organic solvent in which the resin may be dissolved, neutralized by adding a base to an organic continuous phase (O phase), and then an aqueous medium (W phase) is injected, whereby the resin transforms (so-called phase transfer) from W/O to O/W so as to become a discontinuous phase, and the resin is dispersed in the aqueous medium in a particle form.

The volume average particle diameter of the polyester resin particles that are dispersed in the resin particle dispersion liquid is, for example, in a range of from 0.01 µm to 1 µm, preferably from 0.08 µm to 0.8 µm, and from 0.1 µm to 0.6 µm.

Meanwhile, the volume average particle diameter of the resin particles is measured using a laser diffraction particle size distribution measuring apparatus (manufactured by Horiba Ltd., LA-920). Hereinafter, the volume average particle diameter of particles will be measured in the same manner unless otherwise described.

The content of the polyester resin particles included in the resin particle dispersion liquid is, for example, from 5% by weight to 50% by weight, and may be from 10% by weight to 40% by weight.

Meanwhile, in the same manner as for the resin particle dispersion liquid, for example, a colorant dispersion liquid and a release agent dispersion liquid are also prepared. That is, the volume average particle diameter of the particles, the dispersion medium, the dispersing method, and the content of the particles for the resin particle dispersion liquid are similarly applied to colorant particles that are dispersed in the colorant dispersion liquid and release agent particles that are dispersed in the release agent dispersion liquid.

Agglomerated Particle-Forming Process

Next, the colorant particle dispersion liquid and the release agent dispersion liquid are mixed with the resin particle dispersion liquid.

In addition, heteroaggregation of the polyester resin particles, the colorant particles, and the release agent particles is caused in the dispersion liquid mixture so as to form aggregated particles having a diameter that is close to the target particle of the toner particles and includes the polyester resin particles, the colorant particles, and the release agent particles.

Specifically, for example, an aggregating agent is added to the dispersion liquid mixture, the pH of the dispersion liquid mixture is adjusted to be acidic (for example, a pH of 2 to 5), a dispersion stabilizer is added as necessary, then, the solution is heated to a temperature of the glass transition temperature (specifically, for example, from 30° C. lower than the glass transition temperature of the polyester resin particles to 10° C. lower than the glass transition temperature) of the polyester resin particles, and the particles dispersed in the dispersion liquid mixture are aggregated, thereby forming aggregated particles.

In the aggregated particle-forming process, for example, the above heating may be carried out after adding the aggregating agent at room temperature (for example, 25° C.) while the dispersion liquid mixture is stirred using a rotary shearing homogenizer, adjusting the pH of the dispersion liquid mixture to be acidic (for example, a pH of 2 to 5), and adding a dispersion stabilizer as necessary.

Examples of the aggregating agent include surfactants having a reverse polarity with respect to the surfactant used as the dispersant that is added to the dispersion liquid mixture, such as inorganic metallic salts and di or higher-valent metallic complexes. Particularly, in a case in which a metallic complex is used as the aggregating agent, the amount of the surfactant being used is reduced, and charging characteristics improve.

An additive that forms a complex or a similar bond with the metallic ion of the aggregating agent may be used as necessary. A chelating agent is preferably used as the additive.

Examples of the inorganic metallic salt include metallic salts, such as calcium chloride, calcium nitrate, barium chloride, magnesium chloride, zinc chloride, aluminum chloride, and aluminum sulfate; inorganic metallic salt polymers, such as polyaluminum chloride, polyaluminum hydroxide, and calcium polysulfide; and the like.

A water-soluble chelating agent may be used as the chelating agent. Examples of the chelating agent include oxycarboxylic acids, such as acidum tartaricum, citric acid, and gluconic acid; iminodiacetic acid (IDA), nitrilotriacetic acid (NTA), ethylenediaminetetracetic acid (EDTA), and the like.

The addition amount of the chelating agent is, for example, in a range of from 0.01 part by weight to 5.0 parts by weight, and may be 0.1 part by weight to less than 3.0 parts by weight with respect to 100 parts by weight of the polyester resin particles.

Coalescence Process

Next, the aggregated particle dispersion liquid in which the aggregated particles are dispersed is heated to, for example, the glass transition temperature of the polyester resin particles or higher (for example, a temperature that is 10° C. to 30° C. higher than the glass transition temperature of the polyester resin particles or higher) so as to coalesce the aggregated particles, thereby forming toner particles.

The toner particles are obtained through the above processes.

Meanwhile, the toner particles may be manufactured by undergoing, after the aggregated particle dispersion liquid in which the aggregated particles are dispersed is obtained, a process in which the aggregated particle dispersion liquid and the resin particle dispersion liquid in which the polyester resin particles (the particles of the polyester resin according to the exemplary embodiment) are dispersed are further mixed, aggregation is performed in such a way that the polyester resin particles are further attached to the surfaces of the aggregated particles, thereby forming second aggregated particles, and a process in which a second aggregated particle dispersion liquid in which the second aggregated particles are dispersed is heated, and the second aggregated particles are coalesced, thereby forming core and shell-structured toner particles.

Here, after the end of the coalescence process, the toner particles formed in the solution are subjected to a well-known washing process, a solid-liquid separation process, and drying process so as to obtain dried toner particles.

In the washing process, it is preferable to sufficiently carry out displacement washing using deionized water in terms of charging properties. In addition, the solid-liquid separation process is not particularly limited, but suction filtration, pressurization filtration, or the like is preferably used in terms of productivity. Furthermore, the drying process is not particularly limited, but freeze drying, flash jet drying, fluidized drying, oscillatory fluidized drying, or the like is preferably used in terms of productivity.

In addition, the toner according to the exemplary embodiment is manufactured by, for example, adding an external additive to the obtained dried toner particles, and mixing both. The mixing may be preferably carried out using, for example, a V blender, a Henschel mixer, a Loedige mixer, or the like. Furthermore, as necessary, coarse particles of the toner may be removed using an oscillatory sieving machine, a wind classifier, or the like.

Electrostatic Charge Image Developer

The electrostatic charge image developer according to the exemplary embodiment includes at least the toner according to the exemplary embodiment.

The electrostatic charge image developer according to the exemplary embodiment may be a single-component developer including only the toner according to the exemplary embodiment or a two-component developer in which the toner and a carrier are mixed.

The carrier is not particularly limited, and includes well-known carriers. Examples of the carrier include a resin-coated carrier, a magnetic dispersion carrier, a resin dispersion carrier, and the like.

In the two-component developer, the mixing ratio (weight ratio) between the toner according to the exemplary embodiment and the carrier is preferably in a range of toner:carrier=approximately 1:100 to 30:100, and more preferably in a range of approximately 3:100 to 20:100.

Image forming apparatus/image forming method

Next, the image forming apparatus/image forming method according to the exemplary embodiment will be described.

The image forming apparatus according to the exemplary embodiment has an image holding member, a charging unit that charges a surface of the image holding member, an electrostatic charge image forming unit that forms an electrostatic charge image on the surface of the image holding member, a developing unit that accommodates an electrostatic charge image developer and develops the electrostatic charge image using the electrostatic charge image developer so as to form a toner image, a transferring unit that transfers the toner image to a recording medium, and a fixing unit that fixes the toner image to the recording medium.

In addition, the electrostatic charge image developer according to the exemplary embodiment is applied as the electrostatic charge image developer.

Meanwhile, in the image forming apparatus according to the exemplary embodiment, the portion including the developing unit may have, for example, a cartridge structure (process cartridge) that is detachable from the image forming apparatus, and, as the process cartridge, for example, a process cartridge which accommodates the electrostatic charge image developer according to the exemplary embodiment and has the developing unit is preferably used.

The image forming method according to the exemplary embodiment includes charging a surface of an image holding member, forming an electrostatic charge image on the surface of the image holding member, developing the electrostatic charge image using an electrostatic charge image developer that is accommodated so as to form a toner image, transferring the toner image to a recording medium, and fixing the transferred toner image to the recording medium.

In addition, the electrostatic charge image developer according to the exemplary embodiment is applied as the electrostatic charge image developer.

Hereinafter, an example of the image forming apparatus according to the exemplary embodiment will be shown, but the image forming apparatus is not limited thereto. Meanwhile, major portions shown in the drawing will be described, and other portions will not be described.

FIG. 1 is a schematic configuration view showing a 4 tandem-type color image forming apparatus. The image forming apparatus shown in FIG. 1 has first to fourth electrophotographic image forming units 10Y, 10M, 10C, and 10K (image forming units) that output images of the respective colors of yellow (Y), magenta (M), cyan (C), and black (K) based on color-separated image date. The image forming units (hereinafter sometimes referred to simply as the "units") 10Y, 10M, 10C, and 10K are provided in series in the horizontal direction with predetermined intervals therebetween. Meanwhile, the units 10Y, 10M, 10C, and 10K may be process cartridges that are detachable from the main body of the image forming apparatus.

An intermediate transferring belt 20 extends as an intermediate transferring member through the respective units above the respective units 10Y, 10M, 10C, and 10K in the drawing. The intermediate transferring belt 20 is supported by a driving roller 22 and a supporting roller 24 that is in contact with the inside surface of the intermediate transferring belt 20 which are disposed with a gap therebetween from the left to the right in the drawing, and is configured to run in a direction from the first unit 10Y to the fourth unit 10K. Further, a force is applied to the supporting roller 24 in a direction away from the driving roller 22 using a spring or the like, not shown, so that a tension is supplied to the intermediate transferring belt 20 supported by both. In addition, an intermediate transferring member cleaning apparatus 30 is provided opposite to the driving roller 22 on the surface of the intermediate transferring belt 20 facing the image holding member.

In addition, developing apparatuses (developing units) 4Y, 4M, 4C, and 4K of the respective units 10Y, 10M, 10C, and 10K are supplied with toners of 4 colors of yellow, magenta, cyan, and black which are accommodated in toner cartridges 8Y, 8M, 8C, and 8K.

Since the first to fourth units 10Y, 10M, 10C, and 10K have equivalent configurations, herein, the first unit 10Y which is disposed on the upstream side in the intermediate transferring belt running direction, and forms yellow images will be representatively described. Further, equivalent portions to the first unit 10Y will be given reference signs to which magenta (M), cyan (C), and black (K) are attached instead of yellow (Y), and therefore the second to fourth units 10M, 10C, and 10K will not be described.

The first unit 10Y has a photoreceptor 1Y that acts as an image holding member. Around the photoreceptor 1Y, a charging roller 2Y that charges the surface of the photoreceptor 1Y to a predetermined potential, an exposure apparatus (electrostatic charge image forming unit) 3 that exposes the charged surface using laser beams 3Y based on color-separated image signals so as to form an electrostatic charge image, a developing apparatus (developing unit) 4Y that supplies a charged toner to the electrostatic charge image so as to develop the electrostatic charge image, a primary transferring roller 5Y (primary transferring unit) that transfers the developed toner image to the intermediate transferring belt 20, and a photoreceptor cleaning apparatus (cleaning unit) 6Y that removes the toner remaining on the surface of the photoreceptor 1Y after primary transferring are sequentially disposed.

Further, the primary transferring roller 5Y is disposed inside the intermediate transferring belt 20, and is provided at a location opposite to the photoreceptor 1Y. Furthermore, bias power supplies (not shown) that apply primary transferring biases are connected to the respective primary transferring rollers 5Y, 5M, 5C, and 5K respectively. The respective bias power supplies change transferring biases applied to the respective primary transferring rollers through the control by a control portion, not shown.

Hereinafter, an operation of forming a yellow image in the first unit 10Y will be described. Firstly, prior to the operation, the surface of the photoreceptor 1Y is charged to a potential of approximately −600 V to −800 V using the charging roller 2Y.

The photoreceptor 1Y is formed by laminating photosensitive layers on a conductive (volume resistivity at 20° C.: $1 \times 10^{-6}$ Ωcm or less) base material. The photosensitive layer generally has a high resistance (approximately the resistance of an ordinary resin), but has a property of changing the specific resistance, upon irradiation of the laser beam 3Y, at a portion irradiated with the laser beam. Therefore, the laser beam 3Y is outputted to the charged surface of the photoreceptor 1Y through the exposure apparatus 3 according to yellow image data sent from the control portion, not shown. The photosensitive layer on the surface of the photoreceptor 1Y is irradiated with the laser beam 3Y, and thus a yellow printing patterned electrostatic charge image is formed on the surface of the photoreceptor 1Y.

The electrostatic charge image is an image formed on the surface of the photoreceptor 1Y through charging, and is a so-called negative latent image formed by lowering the specific resistances at irradiated portions on the photosensitive layer using the laser beam 3Y, flowing charged electric charges on the surface of the photoreceptor 1Y, and, on the other hand, leaving electric charges at portions which are not irradiated with the laser beam 3Y.

The electrostatic charge image formed on the photoreceptor 1Y in the above manner is rotated to a predetermined developing location in accordance with running of the photoreceptor 1Y. In addition, the electrostatic charge image on the photoreceptor 1Y is visualized (developed) using the developing apparatus 4Y at the developing location.

In the developing apparatus 4Y, for example, the electrostatic charge image developer according to the exemplary embodiment which includes at least a yellow toner and a carrier is accommodated. The yellow toner is stirred inside the developing apparatus 4Y so as to be friction-charged, and is held on a developer roll (developer holding member) with electric charges having the same polarity (negative polarity) as the charged electric charges on the photoreceptor 1Y. In addition, the surface of the photoreceptor 1Y passes through the developing apparatus 4Y so that the yellow toner is electrostatically attached to an erased latent image portion on the surface of the photoreceptor 1Y, and a latent image is developed using the yellow toner. Subsequently, the photoreceptor 1Y on which the yellow toner image is formed runs at a predetermined rate, and the toner image developed on the photoreceptor 1Y is transported to a predetermined primary transferring location.

When the yellow toner image on the photoreceptor 1Y is transported to the primary transferring location, a primary transferring bias is applied to the primary transferring roller 5Y, an electrostatic force toward the primary transferring roller 5Y from the photoreceptor 1Y is exerted on the toner image, and the toner image on the photoreceptor 1Y is transferred to the intermediate transferring belt 20. At this time, the applied transferring bias has a positive polarity which is opposite to the negative polarity of the toner, and is controlled to approximately +10 μA using the control portion (not shown) in the first unit 10Y.

Meanwhile, the toner remaining on the photoreceptor 1Y is removed and collected in the cleaning apparatus 6Y.

In addition, primary transferring biases applied to the primary transferring rollers 5M, 5C, and 5K of the second unit 10M and subsequent units are also controlled according to the first unit.

The intermediate transferring belt 20 to which the yellow toner image has been transferred in the above manner in the first unit 10Y is sequentially transported through the second to fourth units 10M, 10C, and 10K, and toner images of the respective colors are overlapped, thereby multiply transferred.

The intermediate transferring belt 20 to which the toner images of 4 colors are multiply transferred through the first to fourth units reaches a secondary transferring portion constituted by the intermediate transferring belt 20, the supporting roller 24 that is in contact with the inside of the intermediate transferring belt, and a secondary transferring roller (secondary transferring unit) 26 disposed on the surface of the intermediate transferring belt 20 facing the image holding member. Meanwhile, a recording medium (target transferring member) P is put into a gap pressed by the secondary transferring roller 26 and the intermediate transferring belt 20 at a predetermined timing using a feeding mechanism, and a secondary transferring bias is applied to the supporting roller 24. At this time, the applied transferring bias has a negative polarity which is identical to the negative polarity of the toner, an electrostatic force toward the recording medium P from the intermediate transferring belt 20 is exerted on the toner image, and the toner image on the intermediate transferring belt 20 is transferred to the recording medium P. Further, the secondary transferring bias at this time is determined in accordance with a resistance detected using a resistance detecting unit (not shown) that detects the resistance of the secondary transferring portion, and is voltage-controlled.

After this, the recording paper P is sent into a pressing portion (nipping portion) between a pair of fixing rolls in a fixing apparatus (roll-shaped fixing unit) 28, and the toner image is fixed on the recording medium P, thereby forming a fixed image.

Examples of the recording medium to which the toner image is transferred include ordinary paper, OHP sheets, and the like which are used in electrophotographic copying machines, printers, and the like.

In order to further improve the smoothness of the image surface after fixing, the surface of the recording medium is also preferably smooth, and, for example, coated paper manufactured by coating the surface of ordinary paper using a resin or the like, printing art paper, and the like are preferably used.

The recording medium P on which a color image is completely fixed is transported toward an ejection portion, and a series of color image forming operations are ended.

Meanwhile, the above exemplified image forming apparatus is configured to transfer the toner image to the recording medium P through the intermediate transferring belt 20, but the configuration is not limited thereto, and the image forming apparatus may have a configuration in which a toner image is directly transferred to a recording medium from a photoreceptor.

Process Cartridge and Toner Cartridge

The process cartridge according to the exemplary embodiment may include a developing unit that accommodates the electrostatic charge image developer according to the exemplary embodiment, and develops an electrostatic charge image formed on a surface of an image holding member using the electrostatic charge image developer so as to form a toner image, and is detachable from an image forming apparatus.

Figure 2:
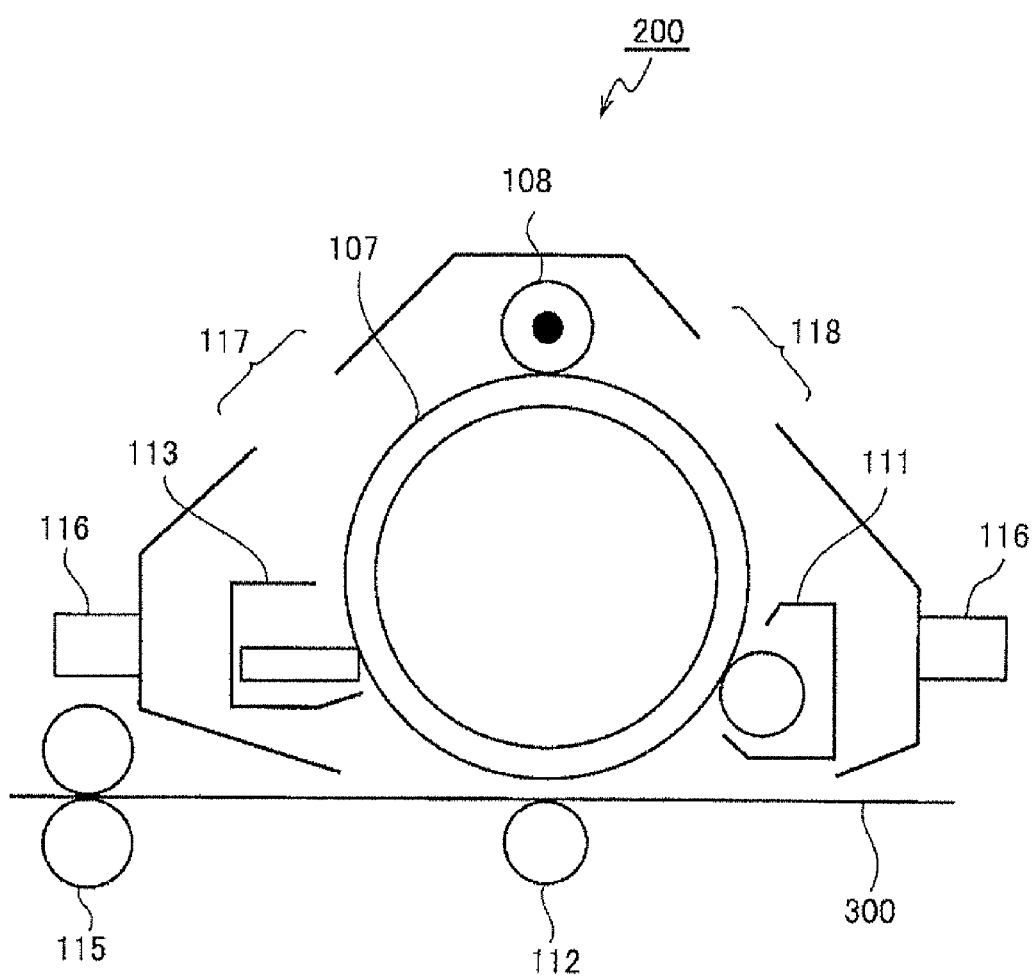
FIG. 2 is a schematic configuration view showing an example of a process cartridge according to the exemplary embodiment.

FIG. 2 is a schematic configuration view showing a preferable example of an exemplary embodiment of a process cartridge that accommodates the electrostatic charge image developer according to the exemplary embodiment. A process cartridge 200 has a charging roller 108, a developing apparatus 111, a photoreceptor cleaning apparatus 113, an opening for exposure 118, and an opening for erasing exposure 117 combined using an attaching rail 116 and integrated with a photoreceptor 107. Meanwhile, reference numeral 300 indicates a recording medium in FIG. 2.

In addition, the process cartridge 200 is freely detachable from an image forming apparatus constituted by a transferring apparatus 112, a fixing apparatus 115, and other components, not shown.

The process cartridge 200 shown in FIG. 2 has the charging apparatus 108, the developing apparatus 111, the cleaning apparatus 113, the opening for exposure 118, and the opening for erasing exposure 117, but these apparatuses may be selectively combined. The process cartridge according to the exemplary embodiment has at least one selected from a group consisting of the charging apparatus 108, the developing apparatus 111, the cleaning apparatus (cleaning unit) 113, the opening for exposure 118, and the opening for erasing exposure 117 in addition to the photoreceptor 107.

Next, the toner cartridge according to the exemplary embodiment will be described. The toner cartridge according to the exemplary embodiment is a toner cartridge which is detachable from an image forming apparatus, and accommodates at least a replenishing electrostatic charge image developing toner to be supplied to a developing unit provided in the image forming apparatus.

Meanwhile, the image forming apparatus shown in FIG. 1 is an image forming apparatus having a configuration in which toner cartridges 8Y, 8M, 8C, and 8K are detachable, and developing apparatuses 4Y, 4M, 4C, and 4K are connected to toner cartridges that correspond to the respective developing apparatuses (colors) using toner supply pipes, not shown. In addition, in a case in which the amount of the toner accommodated in the toner cartridge is small, the toner cartridge is replaced.

EXAMPLES

Hereinafter, the exemplary embodiment will be described specifically using examples, but the exemplary embodiment will not be limited to examples shown below. Meanwhile, in the examples, "part(s)" and "%" indicate "part(s) by weight" and "% by weight" unless otherwise described.

Synthesis of Rosin Diol
Rosin Diol (1)

Bisphenol A diglycidyl ether (113 parts, trade name: jER828, manufactured by Mitsubishi Chemical Corporation) as the bifunctional epoxy compound, a gum rosin (200 parts) which is purified through distillation (distillation conditions: 6.6 kPa, and 220° C.) as the rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining a rosin diol (1) shown in the above exemplary compound.

Rosin Diol (18)

Bisphenol A diglycidyl ether (117 parts, trade name: jER828, manufactured by Mitsubishi Chemical Corporation) as the bifunctional epoxy compound, a disproportionated rosin (200 parts, trade name: PINE CRYSTAL KR-614, manufactured by Arakawa Chemical industries, Ltd.) as the rosin component, and triphenylphosphine (0.3 part, manufactured by Wako Pure Chemical Industries, Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining a rosin diol (18) shown in the above exemplary compound.

Rosin Diol (33)

Hydrogenated bisphenol A diglycidyl ether (156 parts, trade name: EX-252, manufactured by Nagase ChemteX Corporation) as the bifunctional epoxy compound, a disproportionated rosin (212 parts, trade name: PINE CRYSTAL KR614, manufactured by Arakawa Chemical industries, Ltd.) as the rosin component, and triphenylphosphine (0.3 part, manufactured by Wako Pure Chemical Industries, Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining a rosin diol (33) shown in the above exemplary compound.

Rosin Diol (26)

Ethylene glycol diglycidyl ether (80 parts, trade name: EX-810, manufactured by Nagase ChemteX Corporation) as the bifunctional epoxy compound, a disproportionated rosin (200 parts, trade name: PINE CRYSTAL KR614, manufactured by Arakawa Chemical industries, Ltd.) as the rosin component, and 2-methylimidazole (0.2 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining a rosin diol (26) shown in the above exemplary compound.

Rosin Diol (38)

Bisphenol A diglycidyl ether (110 parts, trade name: jER828, manufactured by Mitsubishi Chemical Corporation) as the bifunctional epoxy compound, a hydrogenated rosin (200 parts, a rosin obtained through a hydrogenation treatment of a gum rosin which has been purified through distillation (distillation conditions: 6.6 kPa, and 220° C.) as the rosin component, and triphenylphosphine (0.4 part, manufactured by Wako Pure Chemical Industries, Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining a rosin diol (38) shown in the above exemplary compound.

Synthesis of Polyester Resin
Synthesis of Polyester Resin (1)

Rosin diol (1) (473 parts) as the alcohol component, terephthalic acid (25 parts, manufactured by Wako Pure Chemical Industries, Ltd.) as the acid component, dodecenyl succinic acid (40 parts, manufactured by Tokyo Chemical Industry Co., Ltd.), fumaric acid (33 parts), and tetra-n-butyltitanate (0.7 part, manufactured by Tokyo Chemical Industry Co., Ltd.) as a reaction catalyst are put into a stainless steel reaction vessel having a stirring apparatus, a heating apparatus, a thermometer, a fractional distillation apparatus, and a nitrogen gas introduction pipe, a polycondensation reaction is caused at 230° C. for 7 hours while the solution is stirred under a nitrogen atmosphere, a fact that a molecular weight and acid value reach target values is confirmed, and a polyester resin (1) is synthesized.

Meanwhile, the weight average molecular weight, the number average molecular weight, the molecular weight distribution, the acid value, the glass transition temperature, and the softening point are measured using the above methods.

Syntheses of Polyester Resins (2) to (15)

Polyester resins (2) to (15) are synthesized using the same method as for the polyester resin (1) except that the kinds and addition amounts of the polycondensation components are changed in accordance with Table 3.

Syntheses of Polyester Resins (16) to (18)

Polyester resins (16) to (18) are synthesized using the same method as for the polyester resin (1) except that the kinds and addition amounts of the polycondensation components are changed in accordance with Table 3, and the polycondensation times are changed in accordance with Table 1.

Synthesis of Comparative Polyester Resin (1)

Hexanediol (12 parts, manufactured by Waco Pure Chemical Industries, Ltd.) as the alcohol component, glycerin (37 parts, manufactured by Waco Pure Chemical Industries, Ltd.), terephthalic acid (35 parts, manufactured by Waco Pure Chemical Industries, Ltd.), dodecenyl succinic acid (24 parts, manufactured by Tokyo Chemical Industry Co., Ltd.), citraconic acid (26 parts, manufactured by Tokyo Chemical Industry Co., Ltd.), and a purified rosin (a gum rosin which is purified through distillation (distillation conditions: 6.6 kPa, and 220° C.) as the acid component are put into a stainless steel reaction vessel having a stirring apparatus, a heating apparatus, a thermometer, a fractional distillation apparatus, and a nitrogen gas introduction pipe, a polycondensation reaction is caused at 230° C. for 7 hours while the solution is stirred under a nitrogen atmosphere, a fact that molecular weight and acid value reach target values is confirmed, and a comparative polyester resin (1) is synthesized.

Meanwhile, the weight average molecular weight, the number average molecular weight, the molecular weight distribution, the acid value, the glass transition temperature, and the softening point are measured using the above methods.

Synthesis of Comparative Polyester Resin (2)

A comparative polyester resin (2) is synthesized using the same method as for the polyester resin (1) except that the kinds and addition amounts of the polycondensation components are changed in accordance with Table 4.

Syntheses of Comparative Polyester Resins (3) to (6)

Comparative polyester resins (3) to (6) are synthesized using the same method as for the polyester resin (1) except that the kinds and addition amounts of the polycondensation components are changed in accordance with Table 4, and the polycondensation times are changed in accordance with Table 2.

TABLE 1

| | Polycondensation time |
|---|---|
| Polyester resin (16) | 5 hours |
| Polyester resin (17) | 7 hours |
| Polyester resin (18) | 9 hours |

TABLE 2

| | Polycondensation time |
|---|---|
| Comparative polyester resin (3) | 5 hours |
| Comparative polyester resin (4) | 9 hours |
| Comparative polyester resin (5) | 7 hours |
| Comparative polyester resin (6) | 7 hours |

TABLE 3

| | | Polyester resin | | | | | | | | |
|---|---|---|---|---|---|---|---|---|---|---|
| | | (1) | (2) | (3) | (4) | (5) | (6) | (7) | (8) | (9) |
| Acid component | Terephthalic acid | 25 parts | 35 parts | — | — | 60 parts | 51 parts | 27 parts | 35 parts | 35 parts |
| | Isophthalic acid | — | — | 35 parts | 35 parts | — | — | — | — | — |
| | Dodecenyl succinic acid | 40 parts | 24 parts | 24 parts | 24 parts | 24 parts | 24 parts | 24 parts | 24 parts | 24 parts |
| | Fumaric acid | 33 parts | — | — | — | 6 parts | 12 parts | 29 parts | — | — |
| | Maleic acid anhydride | — | — | 20 parts | — | — | — | — | — | — |
| | Itaconic acid | — | — | — | 26 parts | — | — | — | — | — |
| | Citraconic acid | — | 26 parts | — | — | — | — | — | — | — |
| | Mesaconic acid | — | — | — | — | — | — | — | 26 parts | — |
| | Glutaconic acid | — | — | — | — | — | — | — | — | 26 parts |
| | Traumatic acid | — | — | — | — | — | — | — | — | — |
| | Purified rosin | — | — | — | — | — | — | — | — | — |
| Alcohol component | Rosin diol | (1) 473 parts | (1) 378 parts | (33) 381 parts | (33) 381 parts | (18) 376 parts | (18) 376 parts | (18) 376 parts | (38) 333 parts | (38) 333 parts |
| | Hexanediol | — | 12 parts | 12 parts | 12 parts | 12 parts | 12 parts | 12 parts | — | — |
| | 1,3-Propanediol | — | — | — | — | — | — | — | — | — |
| | Glycerin | — | — | — | — | — | — | — | — | — |
| | BPA-EO[1] | — | — | — | — | — | — | — | — | 52 parts |
| | BPA-PO[2] | — | — | — | — | — | — | — | 52 parts | — |
| Mw (×10000) | | 6.54 | 6.51 | 5.93 | 6.24 | 7.03 | 8.51 | 10.53 | 8.21 | 7.29 |
| Mn (×10000) | | 0.52 | 0.54 | 0.46 | 0.44 | 0.56 | 0.63 | 0.66 | 0.68 | 0.54 |
| Molecular weight distribution (Mw/Mn) | | 12.6 | 12.1 | 12.9 | 14.2 | 12.6 | 13.5 | 16 | 12.1 | 13.5 |
| Acid value (mg KOH/g) | | 11.5 | 12.1 | 13.5 | 12.5 | 12.6 | 12.3 | 13.5 | 14.1 | 14.9 |
| Glass transition temperature (° C.) | | 57 | 57 | 56 | 58 | 57 | 56 | 57 | 58 | 55 |
| Softening point (° C.) | | 120 | 118 | 119 | 115 | 120 | 115 | 112 | 119 | 118 |

TABLE 3-continued

|  |  | Polyester resin | | | | | | | | |
|---|---|---|---|---|---|---|---|---|---|---|
|  |  | (10) | (11) | (12) | (13) | (14) | (15) | (16) | (17) | (18) |
| Acid component | Terephthalic acid | 35 parts | 35 parts | 50 parts | — | — | — | 49 parts | 51 parts | 51 parts |
|  | Isophthalic acid | — | — | — | 35 parts | 35 parts | 35 parts | — | — | — |
|  | Dodecenyl succinic acid | 24 parts | 24 parts | — | 24 parts | 24 parts | 24 parts | 24 parts | 24 parts | 24 parts |
|  | Fumaric acid | — | — | — | 23 parts | 23 parts | 23 parts | 12 parts | 29 parts | 12 parts |
|  | Maleic acid anhydride | — | 20 parts | 20 parts | — | — | — | — | — | — |
|  | Itaconic acid | — | — | — | — | — | — | — | — | — |
|  | Citraconic acid | — | — | — | — | — | — | — | — | — |
|  | Mesaconic acid | — | — | — | — | — | — | — | — | — |
|  | Glutaconic acid | — | — | — | — | — | — | — | — | — |
|  | Traumatic acid | 46 parts | — | — | — | — | — | — | — | — |
|  | Purified rosin | — | — | — | — | — | — | — | — | — |
| Alcohol component | Rosin diol | (38) 381 parts | (18) 282 parts | (18) 423 parts | (26) 310 parts | (33) 381 parts | (33) 381 parts | (18) 376 parts | (18) 376 parts | (18) 376 parts |
|  | Hexanediol | — | 24 parts | — | — | — | — | 12 parts | 12 parts | 12 parts |
|  | 1,3-Propanediol | 8 parts | — | 4 parts | 8 parts | 8 parts | 8 parts | — | — | — |
|  | Glycerin | — | — | — | — | — | — | — | — | — |
|  | BPA-EO[1] | — | — | — | — | — | — | — | — | — |
|  | BPA-PO[2] | — | — | — | — | — | — | — | — | — |
| Mw (×10000) | | 8.11 | 6.54 | 7.01 | 6.93 | 7.21 | 7.11 | 4.11 | 14.5 | 7.21 |
| Mn (×10000) | | 0.64 | 0.52 | 0.51 | 0.51 | 0.52 | 0.52 | 0.33 | 0.72 | 0.3 |
| Molecular weight distribution (Mw/Mn) | | 12.7 | 12.6 | 12.7 | 13.6 | 13.9 | 13.7 | 12.5 | 20.1 | 24 |
| Acid value (mg KOH/g) | | 12.5 | 13.1 | 11 | 10.5 | 10.2 | 14.9 | 12.8 | 12.3 | 12.3 |
| Glass transition temperature (° C.) | | 55 | 55 | 62 | 55 | 59 | 58 | 66 | 58 | 55 |
| Softening point (° C.) | | 120 | 120 | 120 | 117 | 115 | 116 | 115 | 117 | 115 |

[1] Bisphenol A ethylene oxide (2 mol) adduct
[2] Bisphenol A propylene oxide (2 mol) adduct

TABLE 4

|  |  | Comparative polyester resin | | | | | |
|---|---|---|---|---|---|---|---|
|  |  | (1) | (2) | (3) | (4) | (5) | (6) |
| Acid component | Terephthalic acid | 35 parts | 49 parts | 51 parts | 51 parts | 51 parts | 51 parts |
|  | Isophthalic acid | — | — | — | — | — | — |
|  | Dodecenyl succinic acid | 24 parts | 53 parts | 24 parts | 24 parts | 24 parts | 24 parts |
|  | Fumaric acid | — | — | 12 parts | 12 parts | 12 parts | 12 parts |
|  | Maleic acid anhydride | — | — | — | — | — | — |
|  | Itaconic acid | — | — | — | — | — | — |
|  | Citraconic acid | 26 parts | — | — | — | — | — |
|  | Mesaconic acid | — | — | — | — | — | — |
|  | Glutaconic acid, | — | — | — | — | — | — |
|  | Traumatic acid | — | — | — | — | — | — |
|  | Purified rosin | 120 parts | — | — | — | — | — |
| Alcohol component | Rosin diol | — | (1) 378 parts | (18) 376 parts | (18) 376 parts | (18) 376 parts | (18) 376 parts |
|  | Hexanediol | 12 parts | 12 parts | 12 parts | 29 parts | 12 parts | 30 parts |
|  | 1,3-Propanediol | — | — | — | — | — | — |
|  | Glycerin | 37 parts | — | — | — | — | — |
|  | BPA-EO[1] | — | — | — | — | — | — |
|  | BPA-PO[2] | — | — | — | — | — | — |
| Mw (×10000) | | 6.51 | 7.11 | 3.92 | 15.5 | 7.21 | 7.21 |
| Mn (×10000) | | 0.51 | 0.62 | 0.32 | 0.7 | 0.63 | 0.28 |
| Molecular weight distribution (Mw/Mn) | | 12.8 | 11.5 | 12.1 | 22.1 | 11.4 | 25.8 |
| Acid value (mg KOH/g) | | 20.5 | 12.5 | 12.8 | 12.8 | 12.8 | 12.8 |
| Glass transition temperature (° C.) | | 51 | 56 | 56 | 59 | 57 | 54 |
| Softening point (° C.) | | 119 | 122 | 114 | 120 | 115 | 114 |

[1] Bisphenol A ethylene oxide (2 mol) adduct
[2] Bisphenol A propylene oxide (2 mol) adduct Example 1

Toner Particles 1

The components of the following composition are kneaded using an extruder, and pulverized using a surface pulverization-type pulverizer. After that, fine particles and coarse particles are classified using a wind classifier (TURBO-CLASSIFIER (TC-15N), manufactured by Nisshin Engineering Inc.), and a process in which middle-sized particles are obtained is repeated 3 times, thereby obtaining magenta toner particles 1 having a volume average particle diameter of 8 μm.

| Polyester resin (1) | 100 parts by weight |
|---|---|
| Magenta pigment (C.I. Pigment Red 57) | 3 parts by weight |

Toner

Silica (0.5 part by weight, trade name: 8812 (manufactured by Nippon Aerosil Co., Ltd.)) is added to the toner particles 1 (100 parts by weight), and mixed using a high-speed mixer, thereby obtaining a toner.

Developer

The toner and a carrier composed of ferrite having a particle diameter of 50 μm which is coated with a methyl methacrylate-styrene copolymer are used, the toner (7 parts by weight) is added to the carrier (100 parts by weight), and mixed using a tumbler shaker mixer, thereby obtaining a developer.

Meanwhile, the environmental conditions when the toner and the carrier are mixed are 30° C. and a relative humidity of 85% for summer environment, and 5° C. and a relative humidity of 10% for winter environment.

Evaluation

For the toner and the developer which are manufactured above, charging properties, heat storing properties (blocking, toner preserving properties), and low-temperature fixing properties (minimum fixing temperature and fixing properties) are evaluated.

The results are shown in Table 6.

Charging Properties

Using a blow-off charging amount measuring machine manufactured by Toshiba Corporation, the charging amounts of the developer are measured under the summer environment and the winter environment, and a ratio of both (summer environment/winter environment) is obtained.

Meanwhile, as the ratio of both approximates to 1, the difference in the charging amount between under the summer environment and the winter environment decreases, which is a desirable result.

Blocking

Printing test charts are formed at an image density of 1% on 10000 sheets of color paper (J paper) manufactured by Fuji Xerox Co, Ltd. under an atmosphere of 28° C. and 85% RH using the manufactured developers and a modified DocuCentreColor500 manufactured by Fuji Xerox Co., Ltd.

Meanwhile, the fixing temperature is set to a temperature that is 30° C. higher than the minimum fixing temperature (MFT) obtained above.

The presence or absence of white lines generated at the solid portions on the images after the printing of 10000 sheets is visually observed, and the shapes of the toner in the developing machine are visually observed. The blocking resistances are evaluated from the above observation using the following standards.

Evaluation results of B or better are considered to cause no problem during use.

A: No white lines are generated, and toner blocked in the developing machine is rarely observed.

B: No white lines are generated, but toners blocked in the developing machine is observed to a slight extent.

C: White lines are generated to a slight extent, and toner blocked in the developing machine is partially observed.

D: White lines are evidently generated, and toner blocked in the developing machine is observed.

Toner Storing Properties

In the above blocking evaluation, after 10000 sheets of images are formed, the surfaces of the toner remaining in the developing machine are observed using an electronic microscope. 100 toner particles are observed, the number of punctured toner particles is counted, and the toner storing properties are evaluated using the following determination standards.

Evaluation results of B or better are considered to cause no problem during use.

A: No toner is punctured.

B: One to two punctured toner particles are observed.

C: Three to five punctured toner particles are observed.

D: Ten or more punctured toner particles are observed.

Minimum Fixing Temperature

Images are formed on color paper (J paper) manufactured by Fuji Xerox Co., Ltd. with an adjusted amount of the toner of 13.5 g/m² using the manufactured developers and a modified machine of DocuCentreColor500 manufactured by Fuji Xerox Co., Ltd. (which is modified so that fixing is performed with an external fixing device capable of changing fixing temperature). After the images are formed, the images are fixed with a nip width of 6.5 mm or less and a fixing rate of 180 mm/sec using an external fixing device.

meanwhile, in order to evaluate the minimum fixing temperature, the images are fixed while the set temperature of the fixing roll in the external fixing device is increased in increments of 5° C. from 90° C. A crease is formed at the inside of the fixed toner image at the center of the solid portion on paper on which images have been formed at the respective fixing temperatures, portions at which the fixed toner image is destroyed are wiped using tissue paper, the width of a whitely-removed line is measured, and a temperature at which the line width becomes 0.5 mm or less is considered to be the minimum fixing temperature (MFT).

Fixing Properties

After 10000 sheets of images are formed in the blocking evaluation, the surfaces of the fixed images are visually observed, and the presence or absence of marked lines on the paper-feeding roll is evaluated using the following standards.

Evaluation results of B or better are considered to cause no problem during use.

A: No roll mark line is exhibited.

B: Roll mark lines are not exhibited through to the 9000$^{th}$ sheet, but are slightly exhibited at the 10000$^{th}$ sheet.

C: Roll mark lines are exhibited to a slight extent from the 5000$^{th}$ sheet.

D: Roll mark lines are clearly exhibited from the 5000$^{th}$ sheet.

Examples 2 to 4

Toner Particles 2 to 4

Toner particles 2 to 4 are manufactured using the same method as for Example 1 except that the polyester resin 1 and the magenta pigment (C.I. Pigment Red 57) are changed to the polyester resins and pigments shown in Table 5.

A toner and a developer are manufactured in the same manner as for Example 1 except that the toner particles 1 are changed to the toner particles 2 to 4, and evaluated using the same method as for Example 1.

The results are shown in Table 6.

TABLE 5

|  | Polyester resin | Toner particles | Pigment |
| --- | --- | --- | --- |
| Example 2 | Polyester resin (2) | Toner particles 2 | Carbon black (MOGAL L; manufactured by Cabot Corporation) |
| Example 3 | Polyester resin (3) | Toner particles 3 | Cyan pigment (β-type phthalocyanine: C.I. Pigment Blue 15:3 mixture) |
| Example 4 | Polyester resin (4) | Toner particles 4 | Disazo yellow; C.I. Pigment Yellow 12 |

Example 5

Toner Particles 5

Manufacturing of amorphous polyester resin particle dispersion liquid

The polyester resin (5) manufactured above (200 parts by weight) is put into a high-temperature and high-pressure emulsification apparatus (CAVITRON CD1010, manufactured by Eurotec Ltd.), heated, and melted at 120° C. Diluted ammonia water (0.37% by weight) obtained by diluting aqueous ammonia reagent using deionized water is put into a separately prepared aqueous medium tank, and is moved to the CAVITRON at a rate of 0.1 liters/min while being heated to 120° C. using a heat exchanger.

The CAVITRON is operated under conditions of a rotation rate of the rotor of 60 Hz and a pressure of 5 kg/cm$^2$, and an amorphous polyester resin particle dispersion liquid is obtained from the polyester resin (5) having a volume average particle diameter of 160 nm and a solid content of 30% by weight.

Manufacturing of Colorant Particle Dispersion Liquid

The following components are mixed, and dispersed for 1 hour using a high-pressure impact disperser ALTIMIZER (HJP30006, manufactured by Sugino Machine Ltd.), thereby obtaining a colorant particle dispersion liquid having a volume average particle diameter of 180 nm and a solid content of 20% by weight.

| | |
|---|---|
| Cyan pigment (Pigment Blue 15:3, manufactured by Dainichiseika Color & Chemicals Mfg. Co., Ltd.) | 10 parts by weight |
| Anionic surfactant (NEOGEN SC, manufactured by Dai-ichi Kogyo Seiyaku Co., Ltd.) | 2 parts by weight |
| Deionized water | 80 parts by weight |

Manufacturing of Crystalline Polyester Resin Particle Dispersion Liquid

Dodecanedioic acid (115 parts by weight, manufactured by Tokyo Chemical Industry Co., Ltd.) and dodecanediol (101 parts by weight, manufactured by Ube Industries. Ltd.) are put into a flask, the temperature is increased to 160° C. over 1 hour, the fact that the reaction system is stirred is confirmed, and then dibutyltin oxide (0.02 part by weight) is injected. The temperature is increased to 200° C. from 160° C. over 6 hours while distilling additionally generated water away, furthermore, a dehydration condensation reaction continues at 200° C. for 4 hours, and the reaction is ended. After the reaction liquid is cooled, and the solid content obtained through solid-liquid separation is dried at 40° C. under a vacuum state, thereby obtaining a crystalline polyester resin.

The following components including the obtained crystalline polyester resin are heated to 120° C., dispersed using a ULTRA-TURRAX T50 manufactured by IKA, then, dispersed using a pressure ejection-type homogenizer, and collected when the volume average particle diameter becomes 180 nm.

In the above manner, a crystalline polyester resin particle dispersion liquid having 20% by weight of the solid content is obtained.

| | |
|---|---|
| Crystalline polyester resin | 50 parts by weight |
| Anionic surfactant (NEOGEN SC, manufactured by Dai-ichi Kogyo Seiyaku Co., Ltd.) | 2 parts by weight |
| Deionized water | 200 parts by weight |

Manufacturing of toner particles 5

| | |
|---|---|
| Amorphous polyester resin particle dispersion liquid | 150 parts by weight |
| Colorant particle dispersion liquid | 25 parts by weight |
| Crystalline resin particle dispersion liquid | 50 parts by weight |
| Polyaluminum chloride | 0.4 part by weight |
| Deionized water | 100 parts by weight |

The above components are mixed and dispersed in a round stainless steel flask using a ULTRA-TURRAX T50 (manufactured by TKA), and then heated to 48° C. while stirring the flask in a heating oil bath. After the flask is held at 48° C. for 60 minutes, the amorphous polyester resin particle dispersion liquid (70 parts by weight) is added.

After that, the pH in the system is adjusted to 8.0 using an aqueous solution of sodium hydroxide having a concentration of 0.5 mol/L, the stainless steel flask is sealed, heated to 90° C. while being continuously stirred using a magnetic seal as the seal for the stirring axis, and held for 3 hours.

After the end of the reaction, the components are cooled at a temperature-decrease rate of 2° C./min, filtered, sufficiently washed using deionized water, and solid and liquid are separated through Nutsche-type suction filtration. In addition, the components are re-dispersed using 3 L of deionized water at 30° C., stirred and washed at 300 rpm for 15 minutes. The washing operation is further repeated 6 times, and solid and liquid are separated using No. 5A filtration paper through Nutsche-type suction filtration when the pH of the filtrate becomes 7.54, and the electrical conductivity becomes 6.5 μS/cm.

Next, vacuum drying is carried out for 12 hours, thereby obtaining toner particles 5.

The volume average particle diameter of the toner particles 5 is measured using the above method, and is 5.9 μm.

Toner

Furthermore, silica (SiO$_2$) particles having a primary particle average particle diameter of 40 nm whose surfaces are hydrophobation-treated using hexamethyldisilazane (hereinafter sometimes referred to as "HMDS") and metatitanic acid compound particles having a primary particle diameter average particle diameter of 20 nm which is a reaction product between a metatitanic acid and isobutyltrimethoxysilane are added to the toner particles 5 so that the rates of the respective coloring particles coated on the surface becomes 40%, and mixed using a Henschel mixer, thereby manufacturing a toner.

Developer

The toner manufactured above is added to a ferrite carrier which is coated with 1% by weight of polymethacrylate (manufactured by Soken Chemical & Engineering Co., Ltd.) and has a volume average particle diameter of 50 μm so that the toner concentration becomes 5% by weight, then, stirred and mixed for 5 minutes with a ball mill, thereby preparing a developer.

Next, the developer is evaluated using the same method as for Example 1. The results are shown in Table 6.

Examples 6 to 18 and Comparative Examples 1 to 6

Toner particles 6 to 18 and comparative toner particles 1 to 6

Toner particles 6 to 18 and comparative toner particles 1 to 6 are manufactured using the same method as for Example 5 except that the polyester resin (5) is changed to polyester resins (6) to (18) and comparative polyester resins (1) to (6) shown in Tables 3 and 4.

A toner and a developer are manufactured in the same manner as for Example 1 except that the toner particles 1 are changed to toner particles 6 to 18 and comparative toner particles 1 to 6.

The obtained toner and developer are evaluated in the same manner as for Example 1.

The evaluation results are shown in Table 6.

TABLE 6

| | | | Charging amount | | | Minimum fixing temperature (° C.) | Blocking | Toner storing properties | Fixing properties |
|---|---|---|---|---|---|---|---|---|---|
| | | | (1) Summer environment (30° C./85%) | (2) Winter environment (5° C./10%) | (1)/(2) | | | | |
| Example 1 | Polyester resin 1 | Toner particles 1 | −35.9 μC/G | −53.7 μC/G | 0.67 | 125 | A | A | A |
| Example 2 | Polyester resin 2 | Toner particles 2 | −33.8 μC/G | −58.6 μC/G | 0.58 | 130 | A | A | B |
| Example 3 | Polyester resin 3 | Toner particles 3 | −33.7 μC/G | −51.5 μC/G | 0.65 | 125 | A | A | A |
| Example 4 | Polyester resin 4 | Toner particles 4 | −34.6 μC/G | −53.4 μC/G | 0.65 | 130 | A | A | A |
| Example 5 | Polyester resin 5 | Toner particles 5 | −32.5 μC/G | −55.3 μC/G | 0.59 | 130 | A | A | A |
| Example 6 | Polyester resin 6 | Toner particles 6 | −34.7 μC/G | −53.2 μC/G | 0.65 | 115 | A | A | A |
| Example 7 | Polyester resin 7 | Toner particles 7 | −36.3 μC/G | −58.1 μC/G | 0.62 | 110 | A | A | A |
| Example 8 | Polyester resin 8 | Toner particles 8 | −35.2 μC/G | −53.0 μC/G | 0.66 | 130 | A | A | B |
| Example 9 | Polyester resin 9 | Toner particles 9 | −31.1 μC/G | −57.1 μC/G | 0.54 | 120 | B | B | A |
| Example 10 | Polyester resin 10 | Toner particles 10 | −32.0 μC/G | −56.2 μC/G | 0.57 | 120 | B | B | A |
| Example 11 | Polyester resin 11 | Toner particles 11 | −36.1 μC/G | −57.3 μC/G | 0.63 | 120 | B | B | A |
| Example 12 | Polyester resin 12 | Toner particles 12 | −34.2 μC/G | −52.4 μC/G | 0.65 | 120 | A | A | A |
| Example 13 | Polyester resin 13 | Toner particles 13 | −36.3 μC/G | −53.5 μC/G | 0.68 | 120 | B | B | A |
| Example 14 | Polyester resin 14 | Toner particles 14 | −31.8 μC/G | −54.6 μC/G | 0.58 | 115 | A | A | A |
| Example 15 | Polyester resin 15 | Toner particles 15 | −31.5 μC/G | −53.7 μC/G | 0.59 | 115 | A | A | A |
| Example 16 | Polyester resin 16 | Toner particles 16 | −34.7 μC/G | −53.2 μC/G | 0.65 | 115 | A | A | A |
| Example 17 | Polyester resin 17 | Toner particles 17 | −34.7 μC/G | −53.2 μC/G | 0.65 | 120 | A | A | A |
| Example 18 | Polyester resin 18 | Toner particles 18 | −34.7 μC/G | −53.2 μC/G | 0.65 | 110 | B | B | A |
| Comparative example 1 | Comparative polyester resin 1 | Comparative toner particles 1 | −18.5 μC/G | −53.8 μC/G | 0.34 | 120 | D | D | B |
| Comparative example 2 | Comparative polyester resin 2 | Comparative toner particles 2 | −25.5 μC/G | −55.9 μC/G | 0.46 | 140 | B | B | B |
| Comparative example 3 | Comparative polyester resin 3 | Comparative toner particles 3 | −34.7 μC/G | −53.2 μC/G | 0.65 | 125 | D | C | C |
| Comparative example 4 | Comparative polyester resin 4 | Comparative toner particles 4 | −34.7 μC/G | −53.2 μC/G | 0.65 | 140 | A | A | C |
| Comparative example 6 | Comparative polyester resin 5 | Comparative toner particles 5 | −34.7 μC/G | −53.2 μC/G | 0.65 | 150 | A | A | D |
| Comparative example 6 | Comparative polyester resin 6 | Comparative toner particles 6 | −34.7 μC/G | −53.2 μC/G | 0.65 | 140 | C | C | B |

From the above results, it is evident that heat storing properties and low-temperature fixing properties are excellent in the examples compared to the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyester resin for a toner which is a polycondensate of a dicarboxylic acid component and an alcohol component including rosin diol that is represented by the following formula (1), and has a weight average molecular weight (Mw) of from 40000 to 150000, and a molecular weight distribution (Mw/Mn) of from 12 to 25,

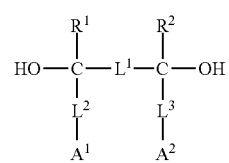

wherein $R^1$ and $R^2$ each independently represents hydrogen or a methyl group;

$L^1$ represents a linking group selected from the group consisting of

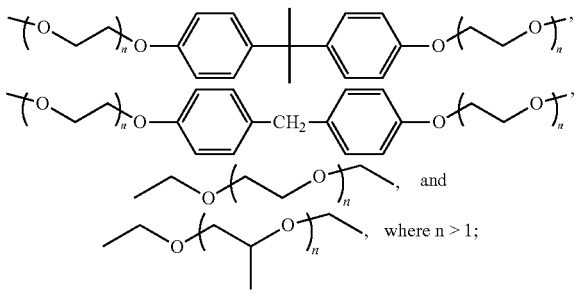

, and

, where n > 1;

L² and L³ each independently represents a divalent linking group selected from the group consisting of a carbonyl group, a carboxyl group, an ether group, a sulfonyl group, a chain-like alkylene group which may have a substituent, a cyclic alkylene group which may have a substituent, an arylene group which may have a substituent, and combinations thereof; and A¹ and A² represent a rosin ester group.

2. The polyester resin for a toner according to claim 1, wherein the dicarboxylic acid component includes at least one kind of unsaturated dicarboxylic acid.

3. The polyester resin for a toner according to claim 1, wherein the polyester resin has the weight average molecular weight (Mw) of from 50000 to 90000.

4. The polyester resin for a toner according to claim 1, wherein the polyester resin has the molecular weight distribution (Mw/Mn) of from 14 to 20.

5. An electrostatic charge image developing toner comprising the polyester resin for a toner according to claim 1.

6. An electrostatic charge image developer comprising the electrostatic charge image developing toner according to claim 5.

7. A toner cartridge that contains the electrostatic charge image developing toner according to claim 5, and is detachable from an image forming apparatus.

8. A process cartridge which is detachable from an image forming apparatus, comprising:
a developing unit that contains the electrostatic charge image developer according to claim 6, and develops an electrostatic charge image formed on a surface of an image holding member using the electrostatic charge image developer so as to form a toner image.

9. An image forming apparatus comprising:
an image holding member;
a charging unit that charges a surface of the image holding member;
an electrostatic charge image forming unit that forms an electrostatic charge image on the surface of the image holding member;
a developing unit that contains the electrostatic charge image developer according to claim 6, and develops the electrostatic charge image using the electrostatic charge image developer so as to form a toner image;
a transferring unit that transfers the toner image to a recording medium; and
a fixing unit that fixes the toner image to the recording medium.

10. An image forming method comprising:
charging a surface of an image holding member;
forming an electrostatic charge image on the surface of the image holding member;
developing the electrostatic charge image using the electrostatic charge image developer according to claim 6 so as to form a toner image;
transferring the toner image to a recording medium; and
fixing the toner image to the recording medium.

11. The polyester resin for a toner according to claim 1, wherein the rosin ester group of the rosin diol is a (a) polymerized rosin, (b) phenol-modified rosin, (c) unsaturated carboxylic acid-modified rosin, or (d) rosin selected from the group consisting of a combination of at least two of (a), (b), and (c).

12. The polyester resin for a toner according to claim 1, wherein $L^1$ contains an alicyclic group.

* * * * *